United States Patent
Zhang et al.

(10) Patent No.: US 11,898,852 B2
(45) Date of Patent: Feb. 13, 2024

(54) LOCATION CALIBRATION BASED ON MOVEMENT PATH AND MAP OBJECTS

(71) Applicant: International Business Machines Corporation, Armonk, NY (US)

(72) Inventors: Jian Zhang, Beijing (CN); Chang Lei, Shanghai (CN); Hu Wang, Beijing (CN); Cheng Zhang, Haidan District (CN); Chuang Cao, Beijing (CN); Shuan Shuan Chen, Beijing (CN); Wei Hong Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 17/247,868

(22) Filed: Dec. 28, 2020

(65) Prior Publication Data

US 2021/0116251 A1 Apr. 22, 2021

Related U.S. Application Data

(63) Continuation of application No. 15/834,096, filed on Dec. 7, 2017, now Pat. No. 10,921,133.

(51) Int. Cl.
*G01S 5/00* (2006.01)
*G01C 21/30* (2006.01)
(Continued)

(52) U.S. Cl.
CPC .............. *G01C 21/30* (2013.01); *G01S 5/00* (2013.01); *H04W 4/027* (2013.01); *H04W 4/029* (2018.02);
(Continued)

(58) Field of Classification Search
CPC ......... G01C 21/30; G01S 5/00; G01S 19/393; G01S 19/50; H04W 4/027; H04W 4/029;
(Continued)

(56) References Cited

U.S. PATENT DOCUMENTS 5,469,360 A * 11/1995 Ihara ................. G01C 21/30
340/995.25
5,884,218 A * 3/1999 Nimura .............. G01C 21/36
701/428
(Continued)

FOREIGN PATENT DOCUMENTS

CN 101789154 A 7/2010
CN 103347297 A * 10/2013
(Continued)

OTHER PUBLICATIONS

Teruaki Kitasuka, et al.—a mobile network, a 14.2 position estimating method, the 1st edition, Japan, Kyoritsu Shuppan Co., Ltd., Mar. 10, 2016, and pp. 225-234 and ISBN: 978-4-320-12353-3 (13 pgs. ) Teruaki Kitasuka, et al.—a mobile network, a 14.2 position estimating method, the 1st edition, Japan, Kyoritsu Shuppan Co., Ltd., Mar. 10, 2016, and pp. 225-234 and ISBN: 978-4-320-12353-3 (13 pgs. ) (Cited with copy of the Original Document and an Abstract description of contents in the English language).

(Continued)

*Primary Examiner* — B M M Hannan
(74) *Attorney, Agent, or Firm* — Maeve Carpenter; George S. Blasiak; Heslin Rothenberg Farley & Mesiti P.C.

(57) ABSTRACT

Methods, computer program products, and systems are presented. The method computer program products, and systems can include, for instance: obtaining movement path data that specifies a location of a mobile article over time within a geographical area having an infrastructure feature; determining by machine logic based on map data and based on the movement path data calibrated location data of the mobile article, wherein the determining based on map data and based on the movement path data calibrated location data of the mobile article includes using map data that
(Continued)

specifies coordinate location data of the infrastructure feature; and providing one or more output based on the determining.

25 Claims, 15 Drawing Sheets

(51) Int. Cl.
  *H04W 4/02* (2018.01)
  *H04W 4/029* (2018.01)
  *H04W 4/70* (2018.01)
  *H04L 12/28* (2006.01)
  *H04L 67/12* (2022.01)
  *H04W 88/02* (2009.01)

(52) U.S. Cl.
  CPC .......... *H04L 12/2854* (2013.01); *H04L 67/12* (2013.01); *H04W 4/70* (2018.02); *H04W 88/02* (2013.01)

(58) Field of Classification Search
  CPC .... H04W 4/70; H04W 88/02; H04L 12/2854; H04L 67/12
  USPC ....... 701/438, 445–447, 454, 473, 482, 495, 701/520
  See application file for complete search history.

(56)     References Cited

U.S. PATENT DOCUMENTS

| | | | | |
|---|---|---|---|---|
| 6,125,323 | A * | 9/2000 | Nimura | G01C 21/30 701/410 |
| 6,199,011 | B1 * | 3/2001 | Matsuda | G01C 21/26 701/445 |
| 7,451,040 | B2 | 11/2008 | Miyahara | |
| 7,949,466 | B2 * | 5/2011 | Atarashi | G01C 21/32 340/988 |
| 8,063,797 | B1 * | 11/2011 | Sonnabend | G08G 1/0129 340/932.2 |
| 8,473,241 | B2 | 6/2013 | Foxli | |
| 9,194,955 | B1 | 11/2015 | Fahrner | |
| 9,569,966 | B2 | 2/2017 | Bobbitt | |
| 9,671,233 | B2 | 6/2017 | Holden et al. | |
| 9,706,515 | B1 * | 7/2017 | Chadwick | H04W 8/20 |
| 10,330,479 | B2 * | 6/2019 | Loomis | G01C 21/30 |
| 10,358,057 | B2 * | 7/2019 | Breed | G01S 17/89 |
| 10,551,509 | B2 * | 2/2020 | Song | G01C 21/30 |
| 10,779,122 | B2 * | 9/2020 | Suzuki | G01S 19/396 |
| 10,921,133 | B2 | 2/2021 | Zhang et al. | |
| 11,493,346 | B2 * | 11/2022 | Dousse | G01C 21/30 |
| 11,669,994 | B1 * | 6/2023 | Ebrahimi Afrouzi | G06T 7/70 348/239 |
| 2002/0128775 | A1 | 9/2002 | Brodie | |
| 2002/0177950 | A1 * | 11/2002 | Davies | G01C 21/30 340/988 |
| 2003/0229441 | A1 * | 12/2003 | Pechatnikov | G01C 21/3667 701/411 |
| 2004/0030493 | A1 | 2/2004 | Pechatnikov | |
| 2004/0204830 | A1 * | 10/2004 | Esaki | G01C 21/30 340/995.16 |
| 2004/0218602 | A1 * | 11/2004 | Hrastar | H04L 67/125 370/390 |
| 2004/0225436 | A1 | 11/2004 | Yoshihashi | |
| 2004/0236498 | A1 | 11/2004 | Le | |
| 2005/0079877 | A1 | 4/2005 | Ichimura | |
| 2006/0111837 | A1 * | 5/2006 | Tauchi | G01C 21/32 340/995.12 |
| 2006/0271298 | A1 * | 11/2006 | MacIntosh | G01C 15/00 702/5 |
| 2006/0293850 | A1 * | 12/2006 | Ahn | G08G 1/096811 701/469 |
| 2007/0287473 | A1 * | 12/2007 | Dupray | H04W 4/029 455/456.1 |
| 2008/0009965 | A1 * | 1/2008 | Bruemmer | G06N 3/008 701/23 |
| 2008/0033640 | A1 | 2/2008 | Amano | |
| 2008/0262721 | A1 * | 10/2008 | Guo | G01C 21/3819 701/532 |
| 2009/0043495 | A1 * | 2/2009 | Hattori | G01S 19/40 701/532 |
| 2009/0174600 | A1 * | 7/2009 | Mazlum | G01S 19/50 342/357.58 |
| 2009/0184867 | A1 * | 7/2009 | Lee | H04W 64/006 707/E17.014 |
| 2009/0228204 | A1 * | 9/2009 | Zavoli | G01C 21/30 701/532 |
| 2010/0004856 | A1 * | 1/2010 | Kobori | G01S 19/485 701/532 |
| 2010/0228405 | A1 | 9/2010 | Morgal | |
| 2011/0153632 | A1 * | 6/2011 | Meyer | G01S 5/02521 707/758 |
| 2011/0163874 | A1 * | 7/2011 | van Os | G01C 21/367 345/173 |
| 2011/0208429 | A1 | 8/2011 | Zheng | |
| 2011/0307394 | A1 | 12/2011 | Rzepecki | |
| 2011/0313648 | A1 | 12/2011 | Newson | |
| 2012/0109511 | A1 | 5/2012 | Swisher et al. | |
| 2012/0136623 | A1 | 5/2012 | Edge | |
| 2012/0182179 | A1 * | 7/2012 | Bamberger | G01S 19/40 342/357.23 |
| 2012/0203453 | A1 * | 8/2012 | Lundquist | G01S 5/02522 701/434 |
| 2012/0239248 | A1 | 9/2012 | Bobbitt | |
| 2013/0132019 | A1 * | 5/2013 | Suzuno | G01C 21/188 702/94 |
| 2013/0150028 | A1 * | 6/2013 | Akins | H04W 4/029 455/456.3 |
| 2013/0166247 | A1 | 6/2013 | Akiyama et al. | |
| 2013/0303195 | A1 * | 11/2013 | Bahl | H04W 64/006 455/456.3 |
| 2013/0311086 | A1 * | 11/2013 | Aoki | G01C 21/32 701/446 |
| 2014/0050362 | A1 * | 2/2014 | Park | G06V 20/56 382/104 |
| 2015/0020558 | A1 * | 1/2015 | Williams | E05B 73/0011 70/18 |
| 2015/0119086 | A1 * | 4/2015 | Mirowski | G01C 21/206 455/456.6 |
| 2015/0185021 | A1 * | 7/2015 | Oh | G01S 17/06 701/522 |
| 2015/0308843 | A1 * | 10/2015 | Ding | G01C 21/30 701/411 |
| 2015/0377640 | A1 * | 12/2015 | Healey | G01C 21/3484 701/538 |
| 2016/0007318 | A1 * | 1/2016 | Onozawa | H04W 64/006 455/456.1 |
| 2016/0110984 | A1 | 4/2016 | Seol | |
| 2016/0169701 | A1 * | 6/2016 | Yang | G01C 21/30 701/412 |
| 2017/0097642 | A1 * | 4/2017 | Okuya | G05D 1/0212 |
| 2017/0120814 | A1 * | 5/2017 | Kentley | B60Q 5/008 |
| 2017/0184407 | A1 * | 6/2017 | Yamashiro | G01S 19/51 |
| 2017/0225742 | A1 * | 8/2017 | Hancock | G01S 19/19 |
| 2017/0242958 | A1 * | 8/2017 | Brown | G16B 20/20 |
| 2017/0245116 | A1 * | 8/2017 | Chu | H04B 17/318 |
| 2017/0347262 | A1 * | 11/2017 | Juliato | H04W 12/33 |
| 2017/0370729 | A1 * | 12/2017 | Laur | G06F 16/29 |
| 2018/0054712 | A1 | 2/2018 | Ahuja | |
| 2018/0091953 | A1 * | 3/2018 | Nagpal | H04W 4/029 |
| 2018/0146343 | A1 | 5/2018 | Lee | |
| 2018/0165525 | A1 * | 6/2018 | Hamada | G01C 21/30 |
| 2018/0209795 | A1 * | 7/2018 | Okuyama | G06F 16/29 |
| 2018/0247537 | A1 * | 8/2018 | Oh | B60W 30/095 |
| 2018/0259621 | A1 * | 9/2018 | Yamazaki | H04N 13/246 |
| 2018/0348333 | A1 * | 12/2018 | Bhatti | H04W 4/029 |
| 2018/0374032 | A1 * | 12/2018 | Pan | G01C 21/3438 |

(56) References Cited

U.S. PATENT DOCUMENTS

| | | | |
|---|---|---|---|
| 2019/0104497 A1* | 4/2019 | Alonso | G01S 5/02529 |
| 2020/0377117 A1* | 12/2020 | Nojiri | B60W 60/001 |

FOREIGN PATENT DOCUMENTS

| | | | | | |
|---|---|---|---|---|---|
| CN | 105788271 | A | * | 7/2016 | G08G 1/0125 |
| CN | 105788271 | A | | 7/2016 | |
| CN | 105979582 | A | * | 9/2016 | |
| CN | 105979582 | A | | 9/2016 | |
| CN | 206031396 | U | * | 3/2017 | |
| CN | 106595686 | A | * | 4/2017 | |
| CN | 106767764 | A | | 4/2017 | |
| CN | 106767764 | A | * | 5/2017 | G01C 21/00 |
| CN | 106940191 | A | * | 7/2017 | G01C 21/30 |
| CN | 111366164 | A | * | 7/2020 | G01C 21/30 |
| DE | 3905602 | C2 | * | 3/1995 | G01C 21/30 |
| DE | 102009022881 | A1 | | 12/2009 | |
| EP | 1441198 | A2 | * | 7/2004 | G01C 21/32 |
| JP | H0784026 | A | * | 3/1995 | |
| JP | 2009229205 | A | | 10/2009 | |
| JP | 201038712 | A | | 2/2010 | |
| JP | 2013130495 | A | | 7/2013 | |
| JP | 2017058235 | A | * | 3/2017 | G01C 21/00 |
| KR | 20130063915 | A | * | 6/2013 | G01C 21/206 |
| KR | 20130074153 | A | * | 7/2013 | |
| WO | WO2016130719 | A2 | | 8/2016 | |
| WO | WO-2018145334 | A1 | * | 8/2018 | G01C 21/12 |

OTHER PUBLICATIONS

Notice of Reasons for Refusal, Application No. JP2020529138, dated Mar. 3, 2022, 7 pgs.

Mel et al., "The NIST Definition of Cloud Computing," National Institute of Standards and Technology, Information Technology Laboratory, Special Publication 800-145, Sep. 2011 (pp. 1-7).

P. Anderson, "Autonomous Bike-Sharing System", Degree Project for Master of Fine Arts in Design at Lund University of Industrial Design, ISRN: LUT-DVIDE/EX-17/50357-SE, 2016.

Written Opinion and International Search Report, International Application No. PCT/IB2018/059657, filed Dec. 5, 2018, dated Mar. 28, 2019.

Zhang et al., "List of IBM Patents and/or Patent Publications Treated as Related", U.S. Appl. No. 17/247,868, filed Dec. 28, 2020, dated Mar. 12, 2021 (2 pages).

* cited by examiner

US 11,898,852 B2

LOCATION CALIBRATION BASED ON MOVEMENT PATH AND MAP OBJECTS

CROSS-REFERENCE TO RELATED APPLICATION

This application is a continuation of U.S. application Ser. No. 15/834,096, filed Dec. 7, 2017, entitled "Location Calibration Based on Movement Path and Map Objects", which is incorporated by reference herein in its entirety.

BACKGROUND

The Internet of Things (IoT) has been recognized as the next significant revolution of Internet. The so-called IoT refers to providing various real-world things, such as streets, roads, buildings, water-supplying systems and household appliances with something like sensing devices, connecting them through the Internet and thereby executing specific programs, so as to achieve remote control or direct communication with these real-world things. The IoT has widened the scope of connected objects from electronics to all kinds of real-world things, that is, archiving human-machine communication and interaction, as well as the communication and interaction between objects by means of radio frequency identifications (RFIDs), sensors, binary codes and the like provided for various kinds of things through connecting to wireless networks via interfaces. As a result, many real-world things can be monitored and operated through networking and their behaviors can be programmed and analyzed for human convenience.

SUMMARY

Shortcomings of the prior art are overcome, and additional advantages are provided, through the provision, in one aspect, of a method. The method can include, for example: obtaining movement path data that specifies a location of a mobile article over time within a geographical area having an infrastructure feature; determining by machine logic based on map data and based on the movement path data calibrated location data of the mobile article, wherein the determining based on map data and based on the movement path data calibrated location data of the mobile article includes using map data that specifies coordinate location data of the infrastructure feature; and providing one or more output based on the determining.

In another aspect, a computer program product can be provided. The computer program product can include a computer readable storage medium readable by one or more processing circuit and storing instructions for execution by one or more processor for performing a method. The method can include, for example: obtaining movement path data that specifies a location of a mobile article over time within a geographical area having an infrastructure feature; determining by machine logic based on map data and based on the movement path data calibrated location data of the mobile article, wherein the determining based on map data and based on the movement path data calibrated location data of the mobile article includes using map data that specifies coordinate location data of the infrastructure feature; and providing one or more output based on the determining.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining movement path data that specifies a location of a mobile article over time within a geographical area having an infrastructure feature; determining by machine logic based on map data and based on the movement path data calibrated location data of the mobile article, wherein the determining based on map data and based on the movement path data calibrated location data of the mobile article includes using map data that specifies coordinate location data of the infrastructure feature; and providing one or more output based on the determining.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
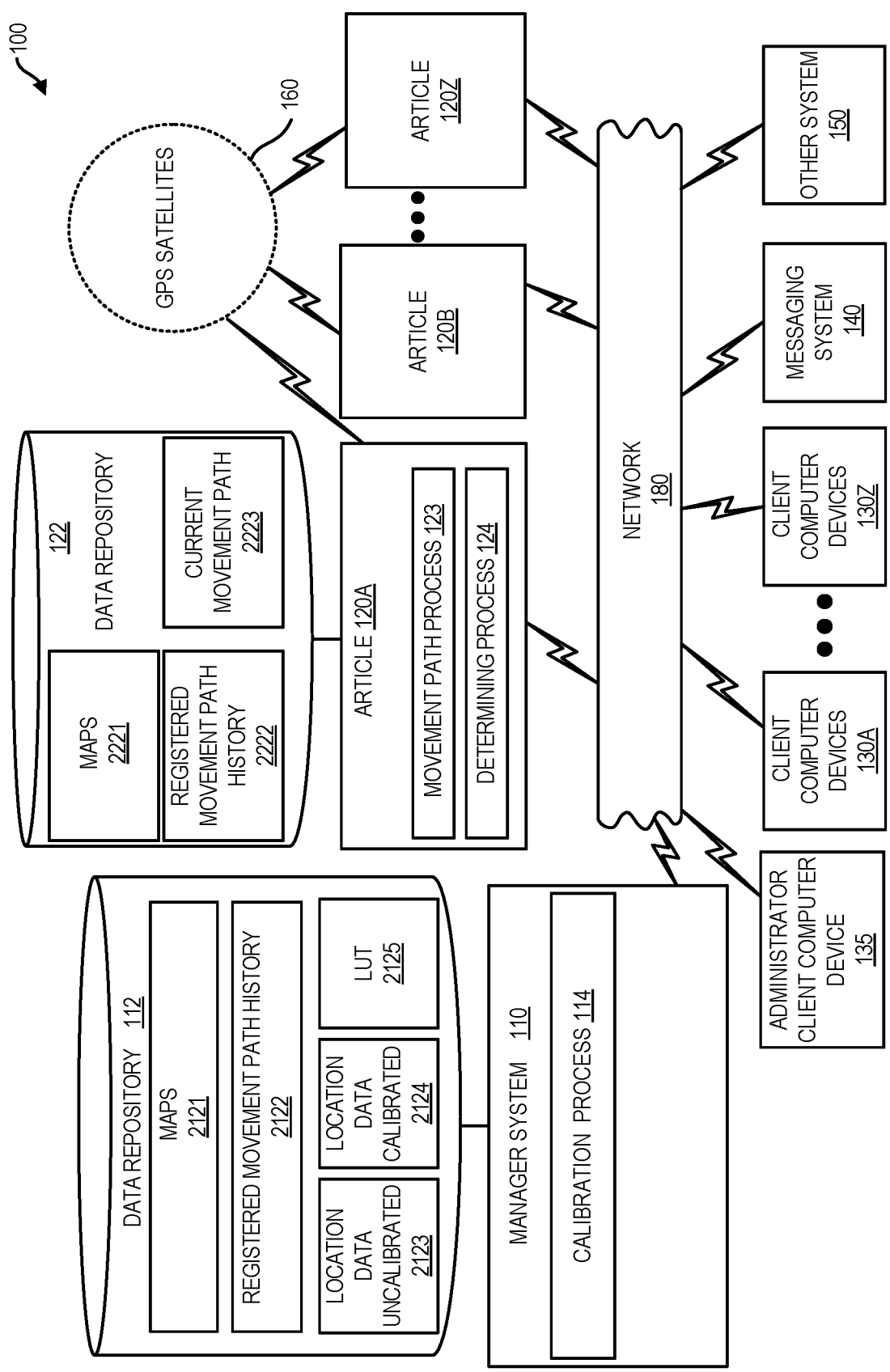
FIG. 1 is a block diagram illustrating a system having a plurality of articles and a manager system according to one embodiment.

FIG. 1 is a block diagram of system 100, in accordance with one embodiment as set forth herein. The embodiment of FIG. 1, system 100 can include numerous devices such as computing node based devices connected by a network 180. For example, network 180 may be a physical network or a virtual network. A physical network can be for example, a physical telecommunications network connecting numerous computing nodes or systems, such as computer servers and computer clients. By contrast, a virtual network can for example, combine numerous physical networks or parts thereof into a logical virtual network.

In one embodiment, system 100 can include a manager system 110 having an associated data repository 112, articles 120A-120Z, client computer devices 130A-130Z, administrator client computer device 135, messaging system 140, and one or more additional system 150 connected with one another and in communication with one another via network 180, which can support bidirectional communications between the various components depicted in FIG. 1, e.g. via the TCP/IP suite of communication protocols. In one embodiment, each article 120A-120Z can have functionality to report location data specifying a current location of the article. In one embodiment, each article 120A-120Z is a computer equipped article having a computing node.

Articles 120A-120Z in one embodiment can be mobile articles that are subject to location tracking by system 100.

Messaging system 140 in one embodiment can be included in a social media system and can include a collection of files, including for example, HTML files, CSS files, image files, and JavaScript files. Messaging system 140 in one embodiment can be provided by a social media system such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Messaging system 140 in one embodiment can have features in common with a social media system but can be custom provided e.g. by an enterprise entity operating manager system 110.

Manager system 110 in one embodiment can be external and remote from each of articles 120A-120Z, client computer devices 130A-130Z, administrator client computer device 135, messaging system 140, and one/or more additional system 150. Manager system 110 in one embodiment can be co-located with one or more of articles 120A-120Z, client computer devices 130A-130Z, administrator client computer device 135, messaging system 140, and/one or more additional system 150.

Manager system 110 can run various processes such as calibration process 114 for calibrating location information of articles 120A-120Z. Manager system 110 running calibration process can determine a calibrated location for an article of articles 120A-120Z e.g. based on movement path data of article and based on map data specifying information of an infrastructure feature in the region of article 120A.

Data repository 112 of manager system 110 can include maps area 2121, registered movement path history area 2122, uncalibrated location data area 2123 and calibrated location data area 2124. In maps area 2121 data repository 112 can store data on maps. Maps data of maps area 2121 can include for example maps of one or more municipality. In one embodiment, maps of maps area 2121 can specify infrastructure features of a municipality, e.g. buildings and/or walls and accurate coordinate location information of such features, e.g. trusted quality coordinate locations of survey quality or near survey quality. In registered movement path history area 2122 data repository 112 can store data on registered movement paths that have been registered during the history of system 100. As will be set forth further herein, a registered movement path can be used for providing of calibrated location data.

In uncalibrated location data area 2123, data repository 112 can store uncalibrated location data. Uncalibrated location data area 2123 can store uncalibrated location data of the various articles 120A-120Z of system 100. Data repository 112 in location data area 2124 can store calibrated location data. Calibrated location data area 2124 can store calibrated location data of articles 120A-120Z of system 100. It will be set forth further herein, manager system 110 can store data on the locations of articles 120A-120Z. In some scenarios of use, uncalibrated location data of uncalibrated location data area 2123 may be sufficient and data of uncalibrated location data area 2123 can be used. In other use scenarios however, more accurate location data of articles 120A-120Z may be useful.

In use scenarios where calibrated located data may be useful, manager system 110 can run calibration process 114 to provide calibrated location data for an article of articles 120A-120Z based on e.g. uncalibrated location data for the article and other data.

Each article of articles 120A-120Z can run various processes and each article of articles 120A-120Z can include an associated data repository 122. Details of articles 120A-120Z are described with reference to article 120A; however, it is highlighted that the elements described with respect to article 120A can apply to each article of articles 120A-120Z.

Article 120A can run various processes including movement path process 123 and determining process 124. Data repository 122 of article 120A can include maps area 2221, registered movement path history area 2222, and/or current movement path area 2223.

Article 120A can run movement path process 123 to iteratively record a current location of article 120A and therefore a movement path of article 120A defined by location data over time. Running of movement path process 123 can include recording in current movement path area 2223 uncalibrated location data specifying the current location of article 120A. It is seen further in the system block diagram of FIG. 1 that each article of articles 120A-120Z can be in communication with GPS satellites 160. Obtaining of location data running movement path process 123 can include the obtaining of location data from an onboard GPS sensor device of article 120A. Embodiments herein recognize that such location data can be useful, but can include an accuracy level that is unacceptable for certain applications. Embodiments herein set forth to calibrate location data to improve the accuracy of the location data.

Article 120A running determining process 124 can determine calibrated location data for article 120A or information useful in determining calibration data. Article 120A running determining process 124 can determine calibrated location data for article 120A based on movement path data of article 120A, e.g. based on the output of running of movement path process 123 and based on map data specifying information of an infrastructure feature in the region of article 120A.

Data repository 122 of article 120A can store in maps area 2221 one or more maps specifying information of infrastructure within a geographical area, e.g. e.g. within a municipality in which the article 120A is currently in. One or more maps stored in maps area 2221 can be periodically downloaded from data repository 112 of manager system 110. Data repository 122 can store in registered movement path history area 2222 data on registered paths. Data of registered movement path history area 2222 can be periodically downloaded by manager system 110 from registered movement path history area 2222 of manager system 110. Data repository 122 in current movement path area 2223 can store data on the current path of article 120A. In current movement path area 2223, there can be recorded over time, an output of a GPS sensor device of article 120A for example.

While article 120A in the embodiment of FIG. 1 can run various processes, articles 120A-120Z in one embodiment can be battery powered and can have featurizations for reduced power consumption. In one embodiment, article 120A (herein representative of all article 120A-120Z) can be absent of a capability to run movement path process 123 and/or determining process 124. In one embodiment data repository 122 of article 120A can be absent of maps area 2221, registered movement path history area 2222 and/or current movement path area. In one embodiment, article 120A can have a minimal number of radio signal receiving devices. For example, in one embodiment, radio signal receiving devices of article 120A which can be a computer equipped and computer node equipped article, can be limited to a Global Positioning Sensor (GPS) sensor device which receives radio signals from orbiting satellites and a single wireless communication device network adapter for supporting communications with manager system 110. The single wireless communication device network adapter can be provided e.g. by a low power wide area network (LP-WAN) radio transceiver configured for support of bi-directional communication with a LPWAN network. In one embodiment article 120A can be absent a display.

Embodiments herein recognize that location data available from a locating service such as a GPS based locating service may in some instances have a low level of accuracy, e.g. accuracy that is suitable for some applications but not suitable for others. Embodiments herein also recognize that available methods for addressing accuracy concerns with respect to location data can require significant resource consumption and/or additional hardware components. For example, assisted GPS solutions may require that initial GPS based data be calibrated using location data from other location data sources, e.g. WiFi or cellular service network. However, these solutions require e.g. additional hardware (one or more additional radio transceiver), additional radio signal transmissions, and/or additional processing of radio signal transmissions. Embodiment herein recognize that such "solutions" are adverse reducing power consumption. Embodiments herein address location data accuracy with solutions that are low cost, power consumption reducing, and lightweight in terms of processing. Embodiments herein can be useful for example in Internet of Things (IoT) applications. Some IoT applications for example can benefit from the tracking of large fleets of inexpensive or low-cost articles. Such articles may be mobile articles that move or are moved from place to place throughout a geographical area. Embodiments herein can accurately track such mobile articles where such mobile articles are configured to include limited hardware and processing functionality. The limited hardware and processing functionality of the mobile articles can reduce the power consumption and increase the battery life of the mobile articles.

Referring again to the system block diagram of FIG. 1, articles 120A-120Z in one embodiment can be provided by personal transportation articles, e.g. low-cost bicycles e.g. rental bicycles available for rent throughout a geographic area. According to a rental bicycle distribution plan, rental bicycles might be moved by riding from a first location of a geographical area to a second location of a geographical area. Manager system 110 benefits from being able to track the location of the article throughout a geographical area. In another embodiment, articles 120A-120Z can be provided by another type of personal transportation (i.e. configured to carry one person but not multiple persons) article to support travel of respective individuals throughout a geographical area, e.g. motorcycles, mopeds, scooters (motorized or not motorized), sleds (motorized or not motorized), skateboards (motorized or not motorized), wheelchairs (motorized or not motorized), strollers (motorized or not motorized) and the like.

Embodiments herein recognize that considerable losses can be realized from mis-location of an article. In some cases, where an article is a computing node based article mis-location can result yield a loss of computer hardware altogether loss of a networked computing node and loss of valuable data provided article which can be performing a critical IOT data producing function. If a computer-equipped article is mis-located resource expenditures to re-locate can be considerable, e.g. can involve deployed notifications and computer network processes, deployed human search teams, notifications to agents, law enforcement, loss of productivity by users and the like.

Embodiments herein recognize that mobile articles that are located with low accuracy locating services can become lost and further recognize that risk of loss can be advanced in cases where there are anticipated to be physical line of sight barriers in a use environment. One example of a physical line of sight barrier is the ubiquitous opaque building wall. An article based on reported location data can be mis-located by less than a meter and indicated to be in the region outside of a wall when it is in fact in the region inside the wall. Such an article will be invisible to a user who arrives at location outside of the wall. Embodiments herein address problems imposed by barriers defined by infrastructure features, such as building walls, other walls, e.g. fence or courtyard demarcation walls. Embodiments herein recognize the problem for example, a mis-location of an article by a small distance, e.g. less than a meter, within a few meters, can yield the information that the article is in a second region (e.g. on a second side) defined by an infrastructure feature, when in fact the article is actually located in a first region (e.g. on a first side) defined by an infrastructure feature. The losses can be significant especially because in some circumstances, the article cannot be located, e.g. may be "hidden" inside a building and significant resources can be expended to either locate or replace the article, and network cognitive computing capacities can be degraded by the absence of a critical data producing computing node.

Figure 2:
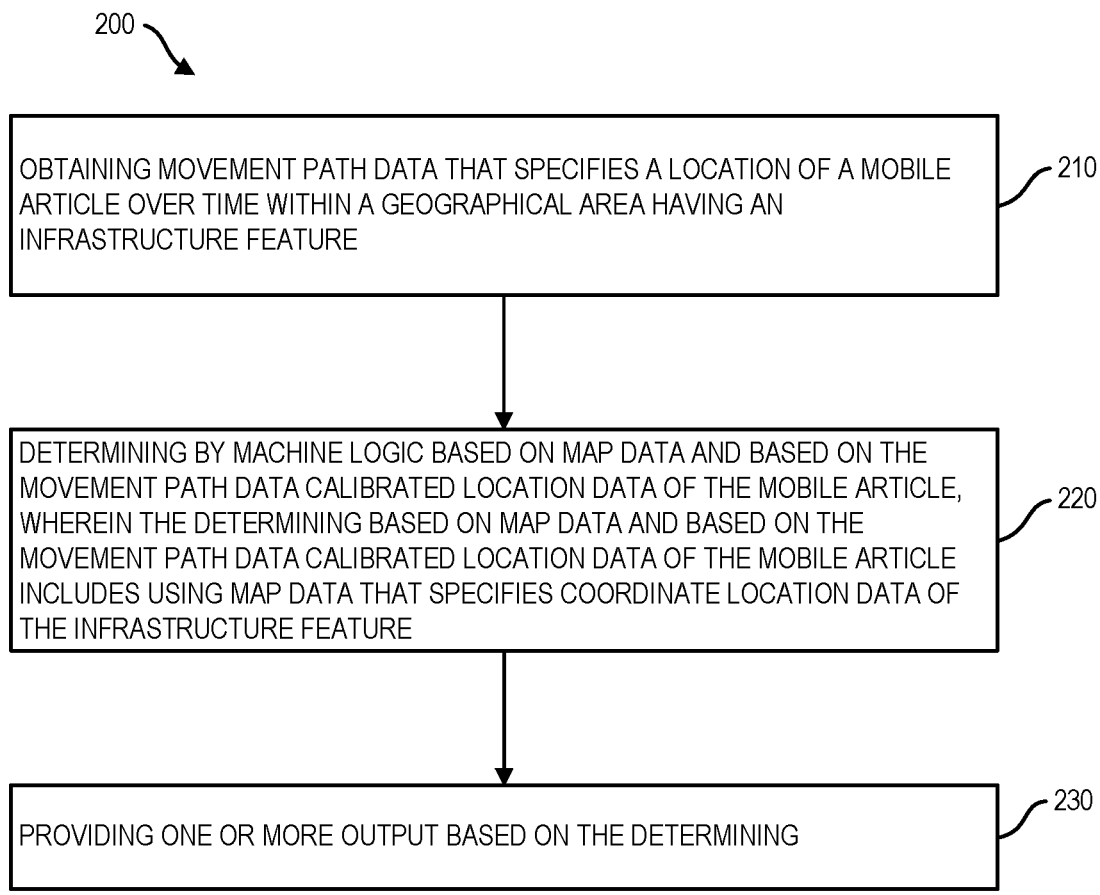
FIG. 2 is a flowchart illustrating a method that can be performed according to one embodiment.

A method for performance by manager system 110 and/or by article, e.g. article 120A is set forth in reference to the flowchart of FIG. 2. Method 200 can include at block 210 obtaining movement path data that specifies a location of a mobile article over time within a geographical area having an infrastructure feature. Method 200 can include, at block 220, determining by machine logic based on map data and based on the movement path data calibrated location data of the mobile article, wherein the determining based on map data and based on the movement path data calibrated location data of the mobile article includes using map data that specifies coordinate location data of the infrastructure feature. Method 200 can include at block 230 providing one or more output based on the determining.

Figure 3:
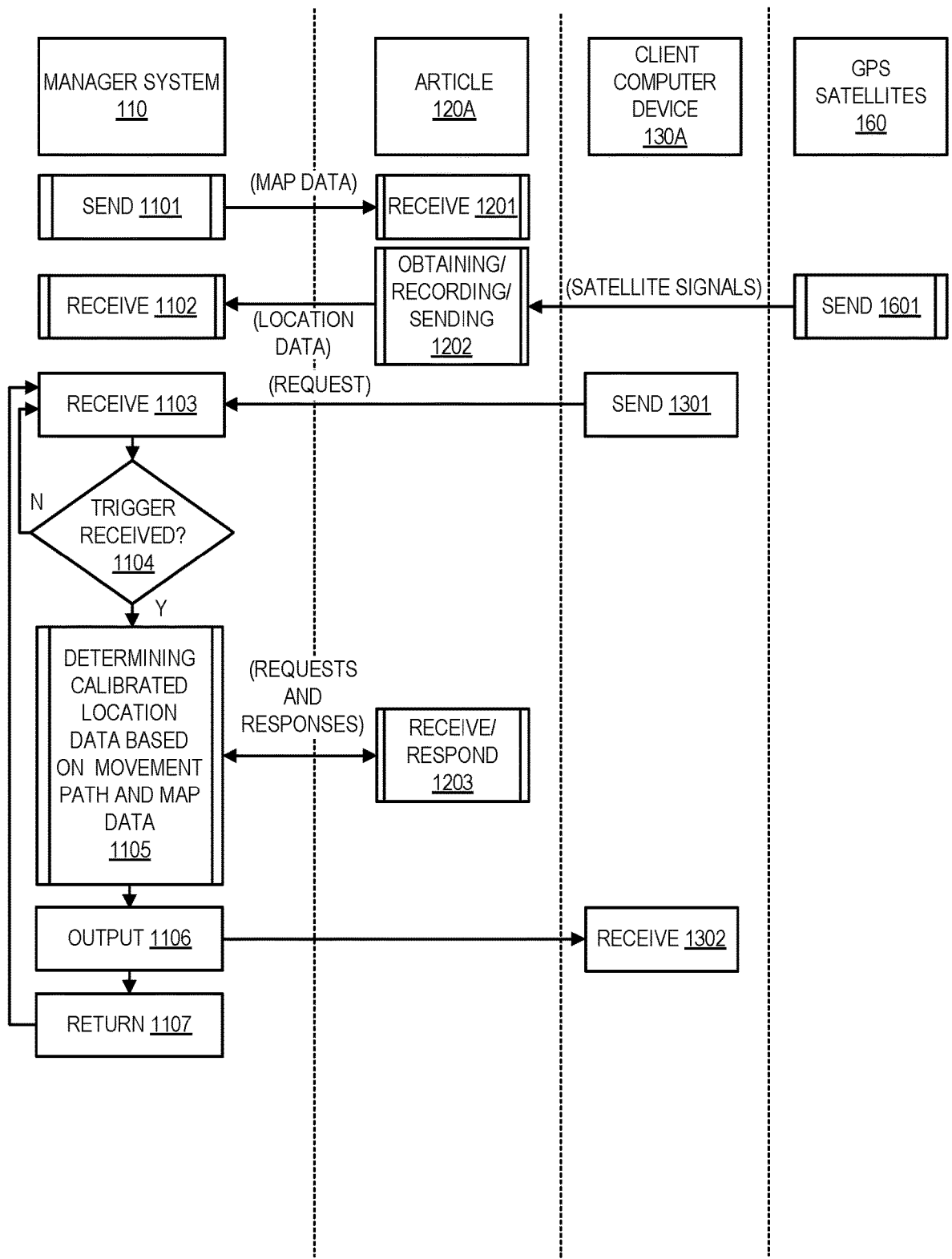
FIG. 3 is a flowchart illustrating a method that can be performed by a computing node interoperating with other components according to one embodiment.

A specific example of method 200 is illustrated with reference to the flowchart of FIG. 3 showing operations of article 120A in the context of its interoperations with manager system 110, client computer device 130A, and GPS satellites 160.

At block 1101, manager system 110 can send for receipt by article 120A at block 1201, map data. In reference to the described scenario where manager system 110 tracks location of articles throughout a geographical area, manager system 110 can periodically push updated map data out to articles 120A-120Z so that these articles are updated with new and relevant map data on a regular basis. The pushed map data can include data on infrastructure features of a geographical area, e.g. building walls and other structures defining or having walls. Infrastructure features can define straight-lined edges or edges of another geometry. For power conservation purposes, the frequency of pushing map data can be modest. In one embodiment, article 120A can be subject to a one time data push or substantially a one time data push on initial deployment. In one embodiment the pushing of map data can be limited to times where article 120A is wireline docked to a resource of manager system 110 e.g. for battery charging. With the pushing of map data at block 1101 manager system 110 can push other useful data such as registered movement path data into registered movement path history area 2222 which stores data on registered movement paths of articles 120A-130Z moving through a geographical area.

At block 1202 article 120A can perform obtaining location data. Throughout the time the article 120A is powered up, article 120A can be iteratively obtaining location data of article 120A. At block 1202 the obtaining of the location data can be accompanied by a recording of location data so that data specifying the current movement path of article 120A is iteratively recorded and available. Article 120A can iteratively record current location data defining a current movement path into current movement path area 2223 of data repository 112. At block 1202 article 120A can be obtaining location data based on an output of a GPS sensor device of article 120A, which sensor device based on signals received from GPS satellites 160 can output reported location data provided by location coordinates. GPS satellites 160 can be iteratively sending radio signals to article at block 1601 for receipt by article 120A at block 1202. Article 120A can perform receiving of radio signals at block 1202 as part of obtaining location data of article 120A.

At block 1202, article 120A can send location data to manager system 110 for receipt by manager system 110 at block 1102 so that manager system obtains the sent location data by receiving the location data. By receiving the location data at block 1102 over time, manager system 110 can record in uncalibrated location data area 2123, movement path data for article 120A that is defined by location data values over time.

The sending of satellite signals at block 1601 for use by article 120A and the recording location data at block 1202 can be iterative and the sending and receiving of location data at blocks 1202 and 1102 (involving manager system 110) can be iterative.

In one embodiment, iteration frequencies of the different iterative processes can be differentiated. Satellite signals at block 1601 for receipt by article 120A at block 1202 can be continuous, the recording of location data into current movement path area 2223 can be at a first sample rate and the sending of location data to manager system 110 can be at a second sample rate, the second sample rate lower than the first sample rate so that in one embodiment a resolution of a current movement path stored article 120A in current movement path area 2223 is greater than a resolution of a current movement path for article 120A stored by manager system 110 in uncalibrated location data area 2123. Concurrently while manager system 110 can be receiving reported location data from article 120A manager system 110 can be receiving location data from each article of a fleet of mobile articles e.g. of articles 120A-120Z.

On receipt of reported location data at block 1102, manager system 110 can update uncalibrated location data area 2123 that stores uncalibrated location data of articles of articles 120A-120Z. As set forth herein, manager system 110 can be configured to be operative in a calibration mode in which it calibrates and improves the accuracy of location data that specifies the location of one or more or articles 120A-120Z such as article 120A.

A number of scenarios are envisioned in which calibration might be useful. In one use case, article 120A might be lost and administrator user may initiate action to calibrate the location of article 120A.

Figure 4:
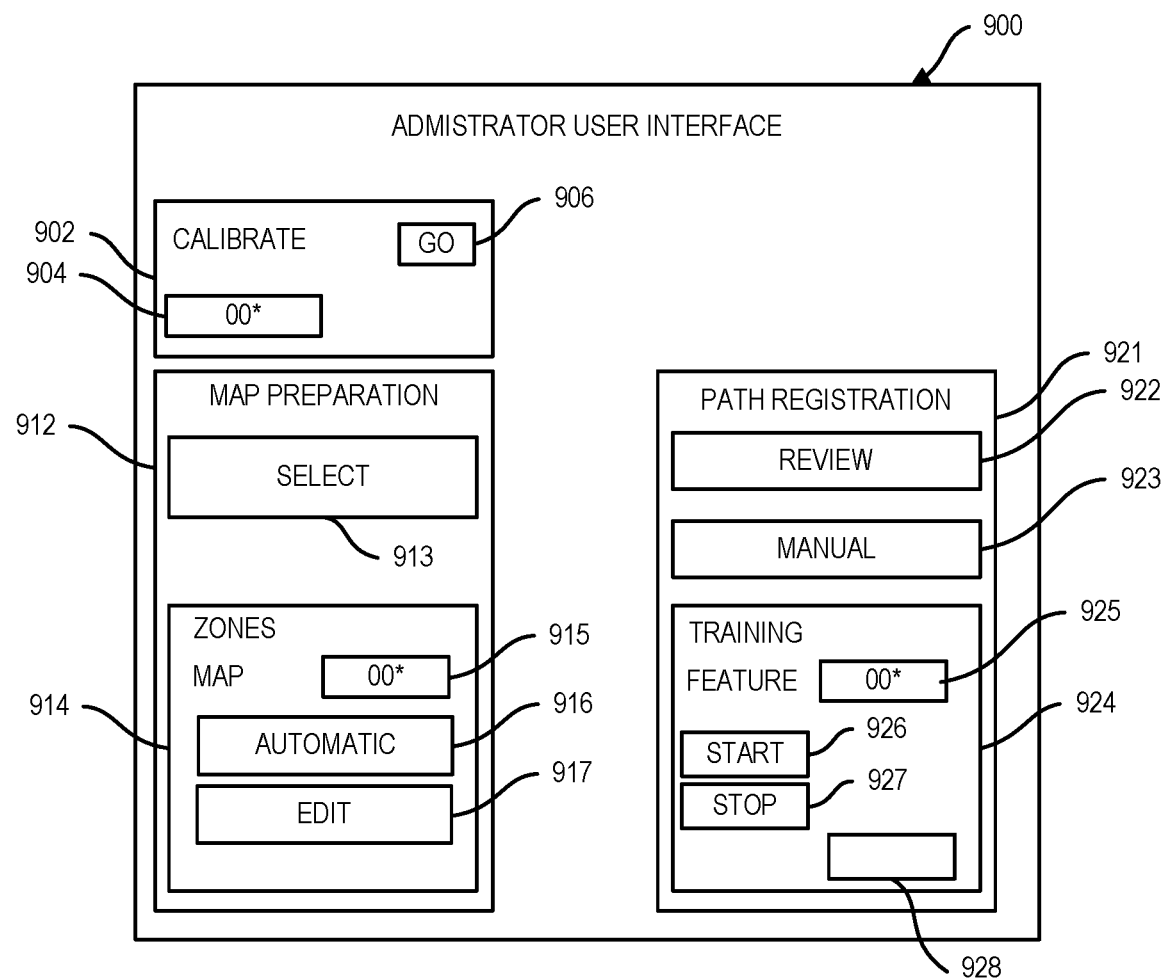
FIG. 4 depicts an administrator user interface according to one embodiment.

Referring to FIG. 4, there is shown an administrator user interface 900 for display on a display of administrator client computer device 135. Administrator user interface 900 can be a manually operated administrator user interface. Administrator user interface 900 can include area 902 for a manual initiation of a location calibration of any article of articles 120A-120Z. In area 904 an administrator user can enter an identifier for a specific article of articles 120A-120Z and can use go button 906 to initiate the calibration of the selected specific article. On selection of go button 906, manager system 110 can activate calibration process 114. In response thereto, article 120A can responsively initiate calibration process 114 to determine calibrated location information of article 120A.

In a specific scenario depicted in FIG. 3, a location calibration to calibrate a location of article 120A can be in response to a request received by manager system 110 from client computer device 130A. In one embodiment, referring again to FIG. 1, system 100 can support rental by a plurality of users of articles included in articles 120A-120Z. For example, articles 120A-120Z can be docked at predetermined docking locations throughout a geographical area, although docking areas can be informal and in some cases unmarked. In other use cases, according to a specific rental program, there may be informal docking rules or no particular docking rules. According to a rental plan in one embodiment, a rental plan can accommodate physical handoff between two (2) users of system 100. Each of the users can operate a different one of client computer devices 130A-130Z. This physical handoff scenario itself can be informal, e.g. article 120A can be left off at a predetermined location by a first user and the first user may exit the predetermined location prior to the second user arriving.

In the scenario depicted in the flowchart of FIG. 3, the depicted client computer devices 130A might be a client computer device being used by such a second user who has arrived at a predetermined location to pick up rented article 120A, but article 120A is not at the predetermined location specified, e.g. because the last location data for article 120A, i.e. the location data sent at block 1203 is inaccurate and hidden by a line of sign barrier such as an opaque wall. Accordingly, with reference to the flowchart of FIG. 3 client computer device 130A at block 1301 can send to manager system 110 for receipt by manager system 110 at block 1103 requesting manager system 110 which manages the rental platform to calibrate the current location of article 120A which has been noted to be lost by the user of client computer device 130A.

Responsively to the receipt of the request at block 1103, manager system 110 can activate calibration process 114. Manager system 110 can be performing the loop of block 1103 and block 1104 to iteratively determine whether a trigger condition has occurred, the trigger condition indicted in the flowchart of FIG. 3 being the trigger condition of the locating request activated by the sending of a request by client computer device 130A.

Based on the trigger condition determined to have occurred at block 1104, manager system 110 can proceed to block 1105 to perform determining a calibrated location of article 120A based on a current movement path of article 120A and map data. Based on manager system 110 determining a calibrated location at block 1105, manager system 110 at block 1106 can provide one or more output. The one or more output can include. sending a notification for receipt by client computer device 130A at block 1302. The notification can include e.g. data of the calibration data determined at block 1105. The notification can include user friendly indicators, e.g., "THE ARTICLE IS AT THE COORDINATES X, Y INSIDE THE BUILDING AT 100 MAIN STREET."

Calibrated location data determined at block 1105 can include various data. In one aspect the calibration data can include a region classifier. As set forth herein mis-located articles as set forth herein can have region classifications in relation to an infrastructure feature, e.g. can be located in a first region or a second region in relation to and defined by an infrastructure feature. Determining calibration data at block 1105 can include determining such region classification. Determining calibration data at block 1105 can also include determining adjusted coordinate location data including adjusted coordinate location data over time to define adjusted movement path data. For providing adjusted location data of reported location data of article 120A received at block 1102, manager system 110 can apply machine logic rules that are based e.g. on one or more of a determined region classification for computer based article 120A and registered movement path data of registered movement path history area 2122. Where reported uncalibrated location data of article 120A locates the article in a first region of an infrastructure feature and the article by operation of a calibration process is classified as being in a second region, manager system 110 at block 1105 can apply an offset to a set of set of coordinate values having associated respective times defining a movement path so that calibrated movement path data (e.g. which can be adjusted by an offset) is provided at block 1105. The most recent timestamped location data defining a movement path can define a current movement path. Thus, location data indicating that an article has remained in a certain location can be excluded from movement path data. Manager system 110 can ascertain a value of the offset based on machine logic rules that are applied to avoid calibrated locations in conflict with locations of infrastructure features (e.g. which would intersect an infrastructure feature) or which conflict with locations proximate an infrastructure feature determined to be untraveled. Manager system 110 for determining untraveled areas with respect to an infrastructure can examine data of registered movement path history area 2122.

Based on manager system 110 at block 1105 determining calibrated location data for article 120A, manager system 110 can provide one or more output at block 1106. The provided one or more output can include e.g. an output to store the calibrated location data (e.g. one or more of region classification, calibrated current location data, and calibrated location data over time (calibrated movement path data)) into calibrated location data area 2124 (e.g. for region classification and for calibrated location data) and into registered movement path history area 2122 (e.g. for calibrated movement path data and for region classification). The provided one or more output can include e.g. an output to send a notification, e.g. a notification specifying the determined calibration data to an administrator user of administrator user interface 900 by sending a notification to administrator client computer device and/or and or a notification specifying the determined calibration data to a user of client computer device 130A by sending a notification to client computer device 130A. At block 1107 manager system 110 can return to block 1103 to wait for another request.

Figure 5:
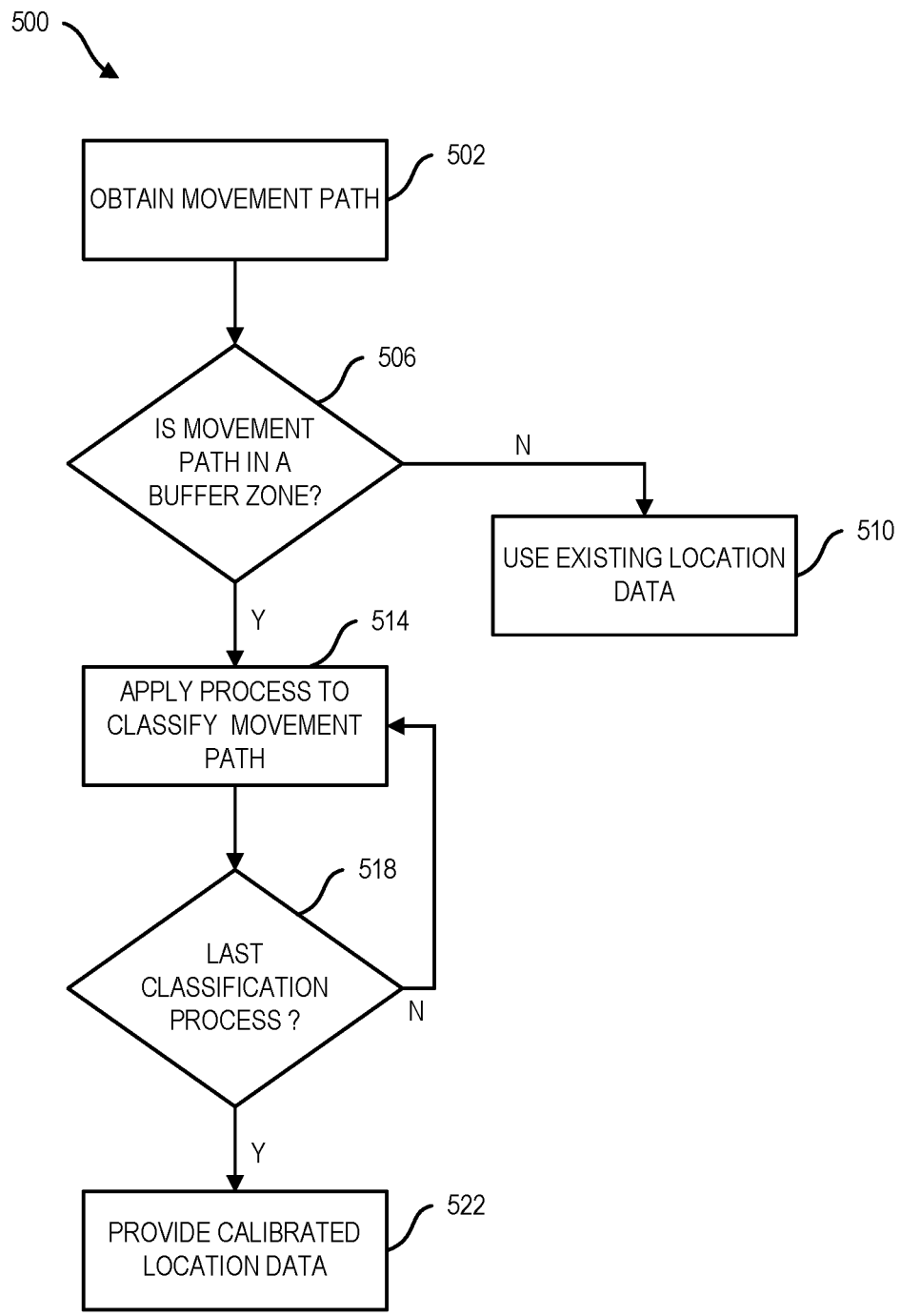
FIG. 5 illustrates a method that can be performed by a computing node according to one embodiment.

Further description of manager system 110 performing a determining of determining calibrated location data at block 1105 is described with reference to the flowchart of FIG. 5. At block 502, manager system 110 can perform obtaining movement path data of article 120A. Block 502 in one embodiment can include manager system 110 obtaining from uncalibrated location data area 2123 data defining a most recent movement path of the article subject to calibration. It will be understood that since article 120A may be stationary and may have been reported stationary location data values for some time, a most recent movement path for article 120A may have time stamps earlier than the current time.

Manager system 110 at block 506 can determine whether the obtained movement path data for article 120A obtained at block 502 is within an established buffer zone of an infrastructure feature proximate to the article 120A. Based on determination that article 120A is not within an established buffer zone of an infrastructure feature, manager system 110 can proceed to block 510. At block 510 manager system 110 can determine that manager system 110 will use existing uncalibrated location data for article 120A without performing calibration of the existing location data.

At block 514, manager system 110 can apply a test for classification of the obtained (e.g. most recent) movement path data of article 120A obtained at block 502. As indicated by decision block 518, manager system 110 can perform one or more classification to classify the obtained movement path (location over time) of article 120A. On completion of a last classification test at block 518 (or earlier, e.g. based on a confidence level threshold being satisfied) manager system 110 can proceed to block 522 to perform providing of calibration location data based on a result of the one or more classifications performed at block 514. The one or more classification performed at block 514 can be based on the obtained movement path data and the aforementioned map data which map data can be obtained from maps area 2121 of data repository 122. At block 514 manager system 110 can iteratively apply different processes to classify a current movement path of article 120A and at block 518 manager system 110 can determine that a last classification process has been performed whereupon manager system 110 can proceed to block 522 to provide calibrated location data.

Embodiments herein recognize that classifications regarding movement path of a mobile article in reference to an infrastructure feature and can be useful in determining a location of the mobile article in reference to the infrastructure feature. Embodiments herein recognize that classifications regarding movement path of a mobile article in reference to an infrastructure feature can be useful in determining a location of the mobile article in reference to the infrastructure feature in the case the mobile article has stopped moving but is still proximate the infrastructure feature. Embodiments herein recognize that an infrastructure feature can define a first region, e.g. the outside and a second region (the inside) where the infrastructure feature is a building wall. Embodiments herein also recognize that infrastructure features such as buildings can include openings, e.g. doorways or other types of openings which can be commonly termed simply as openings. Embodiments herein recognize the possible movement paths of a mobile article in respect to an infrastructure feature having an opening include the following (a) a movement path characterized by movement from a first region (outside) to second region (inside) (ingress); and (b) a movement path characterized by a mobile article's movement from a second region (inside) to first region (outside) (egress).

Embodiments herein further recognize that a current location of a mobile article in respect to an infrastructure feature, e.g. whether it is on the first region or the second region (outside or inside) can be based on the mobile article's most recent movement path, i.e. articles on the first region, e.g. outside will have exhibited (a) classified movement path the second region to first region (egress) movement path and articles currently on the second region will have exhibited (b) classified path the first region to second region (ingress) movement path. Processes to perform classification at block 514 can include processes to determine whether a first classified movement path or a second classified movement path has been exhibited by article 120A, wherein the first classified movement path and the second movement path are indicative of different regions with respect to an infrastructure feature. While classification examples are provided in reference to an infrastructure feature having an opening, embodiments herein recognize that movement path data in respect to any arbitrarily shaped infrastructure feature can be useful for classification of locations of mobile articles with respect to the infrastructure feature.

Manager system 110 as indicated with reference to block 506 can perform buffer zone determination filtering prior to performing movement path classification at block 514. Aspects of buffer zone filtering at block 506 in one embodiment are now described. Buffer zone filtering at block 506 can include determining whether a current movement path of article 120A is within an established buffer zone of an infrastructure feature.

Referring again to administrator user interface 900, as shown in FIG. 4, an administrator user can use administrator user interface 900 to prepare maps that are useful in the providing of calibrated location data. In one embodiment, maps for use in providing calibrated location data of an article such as article 120A can include established buffer zones about infrastructure features such as building walls and walls that are not part of a building per se. For preparing a map for use in performing a calibration, an administrator user can use area 912 of administrator user interface 900 as shown in FIG. 4. An administrator user for example can use select area 913 to select starting maps that may be publicly available, e.g. from one or more other system 150 which in one embodiment can be provided by GOOGLE MAPS® (Google Maps is a registered Trademarks of Google, Inc.).

In one embodiment, the starting map can be a top view satellite imagery map. A starting map in one embodiment can be tagged with accurate, e.g. survey quality or near survey quality coordinate location data for features on the map. Referring to map preparation area 912, an administrator user can use zones area 914 to provide configuration data facilitating the establishing of zones by manager system 110. Area 915 of administrator user interface 900 can display an identifier for a current map and/or a geographical area associated to the map. Using area 916 an administrator user can initiate an automatic recognition of infrastructure features represented in a selected map and can further initiate the automatic establishing of buffer zones about infrastructure features that are represented in the selected map. A representation of a selected starting map as show in FIG. 6, in map 600 there can be included representations 601R-612R, e.g. satellite image representations of infrastructure features provided e.g. by building walls defining buildings and walls not associated to a building.

Using area 916, an administrator user can initiate a process performed by manager system 110 to automatically recognize representation 601R-612R as representations of infrastructure features or alternatively to obtain data of infrastructure features by reading pre-marked tags associated to a map that specify attributes such as including coordinate location information of such features.

Manager system 110 can employ, e.g. edge detection and corner detection algorithms to identify representations of infrastructure features in map 600. Also, enhanced maps pre-marked with tags to indicate infrastructure features can be obtained from various map services systems such as GOOGLE MAPS®. An enhanced map can be tagged to tag features of a map including e,g. roads, bodies of water and infrastructure features such as building and walls In some cases an enhanced map can be tagged that building walls are tagged differently from remaining components e.g. roofs of buildings. In some embodiments herein it may be advantageous to provide building wall data for use as infrastructure feature data as set forth herein. Manager system 110 can discriminate building wall data from remaining building data e.g. by obtaining the appropriate tagging information end or by applying a function to derive the wall data based on a known data defining a perimeter of building (e.g. applying the assumption that walls have a uniform thickness of N cm). Map features herein such as infrastructure features and other features can be regarded as map objects.

Edge detection algorithms can employ, e.g. Canny edge detection scheme, edge thinning schemes, and/or differential edge detection schemes. Corner detection algorithms can employ, e.g. the Harrison Stephens corner detection process, a Forstner corner detection process, and/or a multiscale Harris operator process.

Using area 916 of administrator user interface 900 an administrator user can initiate a process performed by manager system 110 to automatically establish buffer zones about identified infrastructure features for inclusion in map data for storing in maps area 2121 and maps area 2221. For establishing a buffer zone about an infrastructure feature, manager system 110 can expand the edge and corner coordinate locations of an identified infrastructure feature outward, e.g. in one embodiment N meters outwardly from each detected edge or corner. Infrastructure feature detection and buffer zone establishing can be performed automatically but it is anticipated that the automatic operations may not always be performed initially and accordingly an editing function can be made available, which an administrator user can access using area 917. According coordinate locations of a buffer zone associated to an infrastructure can be based on coordinate locations of the infrastructure. Buffer zone and infrastructure feature coordinate locations of a map e.g. map 600 as shown in FIG. 7 can be trusted quality coordinate locations, e.g. of survey quality or near survey quality.

Area 917 allows administrator user editing of initially determined infrastructure features and established buffer zones about such features. For example, an initial map classifier can misclassify an infrastructure feature as another type of feature or a non-infrastructure feature can be misclassified as an infrastructure feature. A buffer zone automatically established might be edited e.g. to include areas where a perimeter is manually shaped to improve operation of the buffer zone based on observed patterns.

Figure 7:
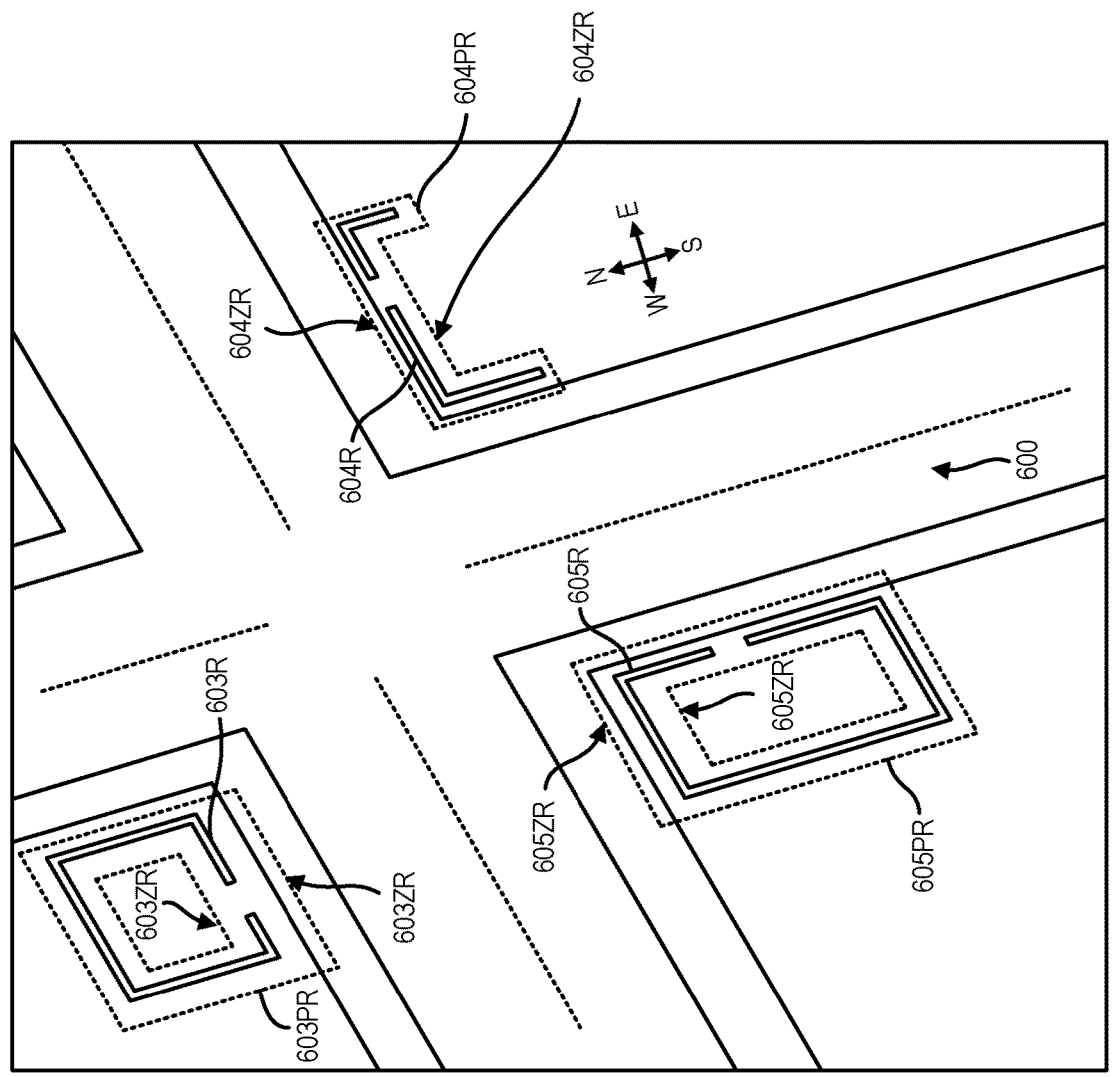
FIG. 7 is an enhanced overhead map illustrating a geographical area having infrastructure features and buffer zones established about infrastructure features according to one embodiment.
Figure 8:
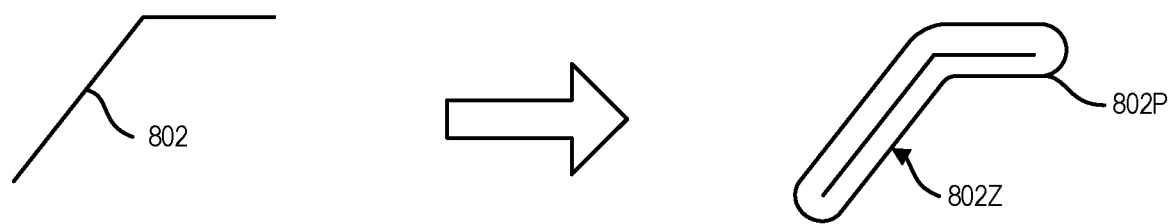
FIGS. 8-9 depict establishing of a buffer zone about an infrastructure feature according to one embodiment.
Figure 9:
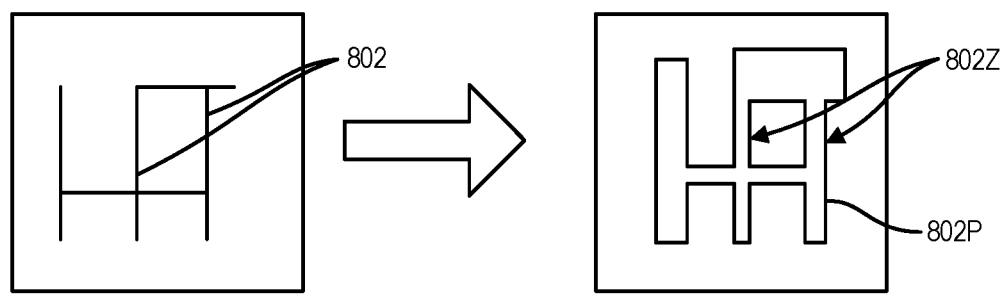

Referring to FIG. 7 there are illustrated representations of buffer zones 603ZR-605ZR and geofence perimeter representations 603PR-605PR established in respect to representations 603R-605R of infrastructure features. In FIGS. 8-9 respectively, there are illustrated additional examples of buffer zones 802Z defining geofence perimeters 802P that can be established in reference to an infrastructure feature 802, which can be provided, e.g. for example by building walls or walls that are not part of buildings. In reference to FIG. 7-9 it is seen that that buffer zone about infrastructure can have an outer perimeter that defines a geofence encompassing an infrastructure feature.

Figure 10:
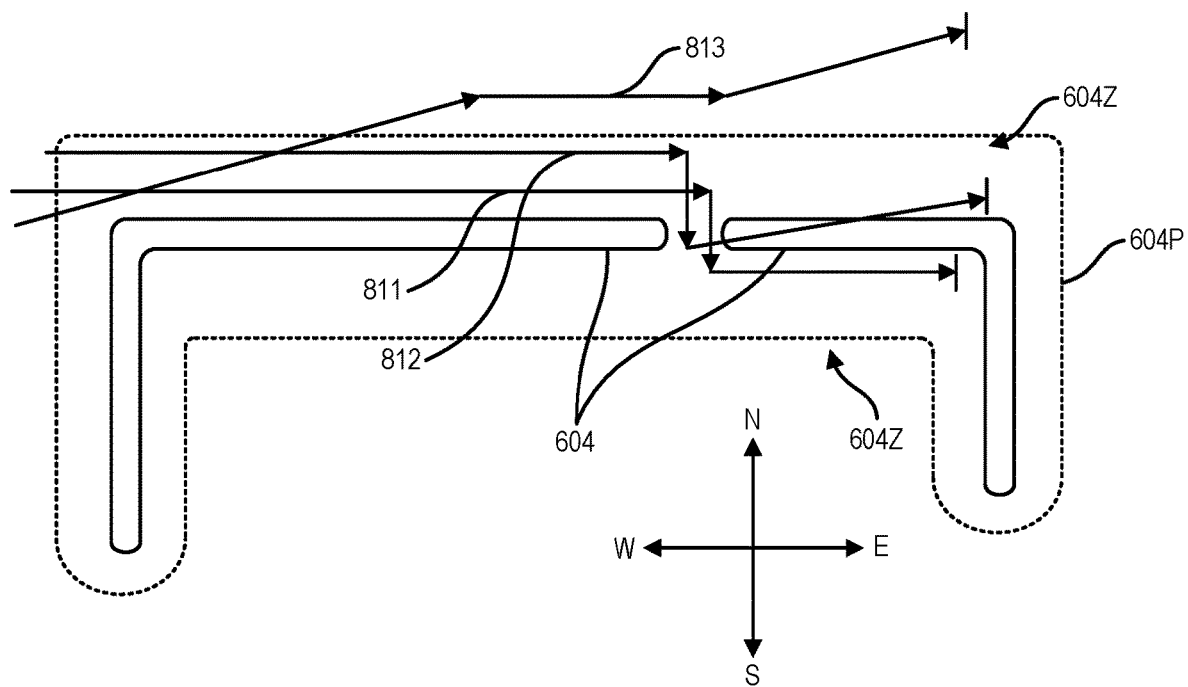
FIG. 10 depicts an infrastructure feature having a buffer zone with a plurality of reported coordinate location movement path superimposed thereon according to one embodiment.

Further description of buffer zone filtering that can be performed at block 506 (FIG. 5) is provided in reference to FIG. 10 depicting infrastructure feature 604 represented with infrastructure representation 604R of the augmented map depicted in FIG. 7. An established buffer zone 604Z that is represented by buffer zone representation 604ZR depicted in the augmented map shown in FIG. 7.

Together with the depicted infrastructure feature 604 and its associated established buffer zone 604Z having a geofence perimeter 604P, there are shown depictions of various movement paths 811-813 of different moving articles of articles 120A-120Z in reference to buffer zone 604Z and infrastructure feature 604. Movement paths 811-813 represent reported movement path location data e.g. based on reported location data sent at block 1102 and may be inaccurate and in conflict with limits that imposed by the physical environment of a geographical area (note that movement path 812 extends through an intersects a wall). Movement path 811 is a reported location data movement path of a first moving article, movement path 812 is a reported location data movement path of a second hypothetical moving article, and movement path 813 is a reported location data movement path of a third hypothetical moving article.

As noted, movement paths 811-813 in the described example may not depict the true coordinate locations of the mobile articles depicted in the movement paths but rather the locations as reported according to potentially inaccurate locating processes that are subject to being calibrated and therefore corrected. Nevertheless, embodiments herein recognize that even inaccurate location data can be used to locate a mobile article within an established buffer zone of an infrastructure feature, such as buffer zone 604Z in the case the mobile article is actually moving reasonably in proximity to the infrastructure feature 604, about which the buffer zone 604Z is established. Embodiments herein recognize for example that moving articles such as personalized transportation articles can be expected in some scenarios to move reasonably extended periods in directions that run parallel to an edge of an infrastructure feature, e.g. a building.

Referring to the filtering that can be performed by a buffer zone. manager system 110, at block 506 (FIG. 5) can determine that an obtained movement path, e.g. the most recent movement path data of an article subject to calibration is within a buffer zone, if the movement path for a path distance determined based on a dimension of the buffer zone is within the buffer zone for more than a threshold percentage distance of the path distance, e.g. 70%, 80%, 90%.

Referring to FIG. 10, manager system 110 at block 506 can determine that movement paths 811 and 812 are within buffer zone 604Z for more than a threshold distance of the path and accordingly manager system 110 in processing of paths 811 and 812 can proceed to block 514. Manager system 110 at block 506 in examining movement path 813 can determine that path 813 is not within buffer zone 604Z based on the segment of path 813 within buffer zone 604Z not exceeding the threshold and can proceed to block 510 to use the existing uncalibrated location data for the corresponding article without proceeding to perform further calibration processes. Manager system 110 can exclude data of a distance movement path when examining whether it belongs to a buffer zone, e.g. can exclude distance that are a threshold distance away from a current location e.g. based on a dimension of the buffer zone.

For performance of buffer zone filtering at block 506 manager system 110 can initially access data of map area 2121 that specifies trusted accuracy coordinate values for an infrastructure feature and buffer zone. At block 506 manager system 110 can selected the proper infrastructure feature and buffer zone data based on the current reported location data of article 120A. That is manager system 110 can select the infrastructure feature (e.g. which can be identified by a serial number identifier) and buffer zone data (e.g. which can be identified by the same serial number identifier) having the closest coordinates to the current coordinates of article 120A according to the uncalibrated location data for article 120A. Embodiments herein recognize that the location data of article 120A can be uncalibrated at this stage but nevertheless sufficient purposes of selection of the proper infrastructure feature and buffer zone data based on the selected infrastructure feature and buffer zone having associated coordinate location data defining a location that is most proximate to the current location of the article 120A as indicated by the reported location data thereof.

Various movement path classifications that can be performed by manager system 110 at block 514 (FIG. 5) are now described.

Manager system 110 at block 510 to perform classification of an obtained movement path can classify the movement path as being accurate or inaccurate based on a comparison of an obtained movement path with map data that specifies trusted accuracy coordinate locations of an infrastructure feature. For performing classification manager system 110 can apply a machine logic rule wherein a movement path of an article intersecting an infrastructure feature is recognized and flagged as being inaccurate. According to one classifying process that can be performed at block 514, manager system 110 based one or more intersection of an obtained movement path with map specified coordinates of one or more infrastructure feature can classify an obtained movement path as being accurate or inaccurate and/or can assign confidence levels to the classification of "accurate" or "inaccurate". Referring to FIG. 10, it will be seen that manager system 110 can assign a higher confidence level for an accurate classification for path 811 that does not intersect infrastructure than for path 812 which does intersect infrastructure feature 604. In one embodiment, where manager system 110 determines that an obtained movement path is free of intersections with a particularly complicated one or more infrastructure feature that can only be navigated by a precise path manager system can assign a high confidence level to an accurate classification and can proceed to provide as determined calibrated location data the current location data of the article, the most recent movement path data of the article, and the region classification of the article according to the current location data.

Figure 11:
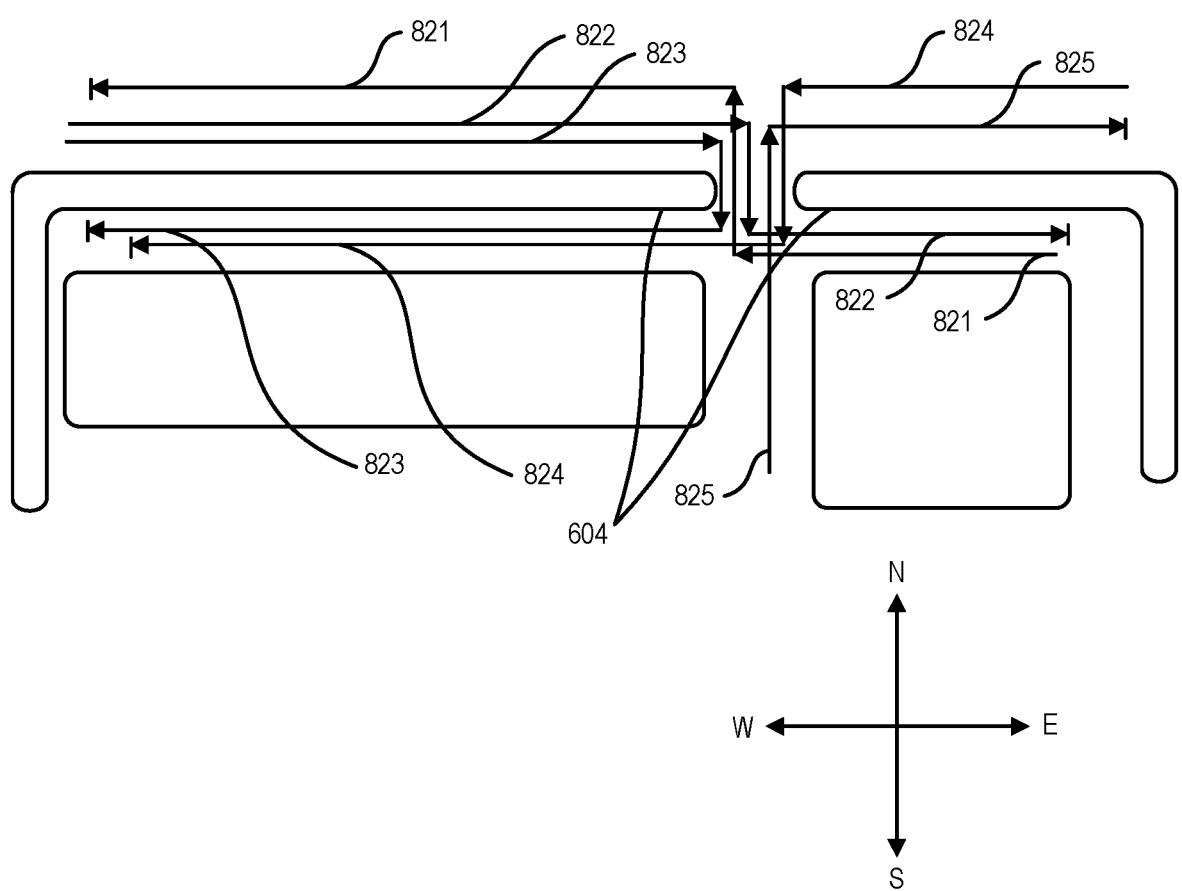
FIG. 11 depicts an infrastructure feature having superimposed thereon ideal movement paths relative to the infrastructure feature according to one embodiment.

Aspects of another classification process that can be performed by manager system 110 at block 514 are described with reference to FIG. 11 depicting a plurality of true coordinate movement paths 821-825 that are possible to travel by actual travelling articles. Because the sampling of possible true coordinate movement paths 821-825 depicted in FIG. 11 are true paths and not merely reported movement location value paths which may be inaccurate, it is seen that none of the depicted paths illustrate an invalid condition as in the case of reported location value movement path 812 in the example of FIG. 10. Referring to Table A, each sample movement path 821-825 can be expressed as a sequence of direction changes, e.g. the direction sequence West, North, West (WNW) for path 821, the direction sequence East, South, East (ESE) for path 822 and so on as summarized in Table A. Embodiments further herein recognize that such direction change sequences can be correlated to different classifications based on the destination location of the true coordinate movement path samples 821-825. The classifications associated with the different direction change sequences for the various movement paths 821-825 are summarized in Table A below.

TABLE A

| PATH | DIRECTION CHANGE SEQUENCE | REGION CLASSIFICATION |
| --- | --- | --- |
| 821 | WNE | OUTSIDE |
| 822 | ESE | INSIDE |
| 823 | ESW | INSIDE |
| 824 | WSW | INSIDE |
| 825 | NE | OUTSIDE |

According to one embodiment, a process to classify a current path at block 514 (FIG. 5) can include performing classification using a lookup table (LUT) according to Table A obtained from LUT area 2125 of data repository. LUTs of LUT area 2125 can be designed according to the data structure of Table A and can associate different direction change sequences with different location classifications in reference to an infrastructure feature, e.g. a first region or a second region in relation to an infrastructure feature or the classifications outside and inside in reference to the specific example described in reference to FIG. 11. LUT area 2125 can store "direction change sequence" to region LUT for each infrastructure feature (e.g. represented by 604R-611R) that is stored for a map depicting a geographical area being service by manager system 110. Each LUTs of LUT area 2125 can be designed using automated machine logic, manual editing by an administrator user, or a combination or machine logic and manual editing.

Referring again to the reported location movement paths depicted in FIG. 10, reference is made to the reported coordinate location movement paths 811 and 812 which qualify for further path classification processing by virtue of being determined at block 506 (FIG. 5) to be within an established buffer zone. Referring to the reported location coordinate movement paths 811 and 812, manager system 110 can determine direction change sequences for paths 811 and 812 and subject such direction change sequences to dissimilarity check processing to determine direction change sequences that have been recorded into the lookup table (LUT) according to Table A. Based on an examining, manager system 110 can determine the direction change sequence for each of path 811 and 812 to be the direction change sequence East, South, East (ESE) which matches the direction sequence having the LUT row entry having an associated region classification "inside." In one embodiment, automated machine logic can be activated to generate a direction sequence for an obtained motion path and matching to existing LUT row entry can be determined based on lowest dissimilarity score rather than by direct matching. Dissimilarity scoring as set forth herein can employ e.g. cosine similarity analysis, clustering analysis, affinity propagation, recurrence plot processing, self-similarity matric processing, semantic similarity analysis, and/or string metric analysis.

Importantly, it will be seen that with classification performed using a LUT according to Table A, the mobile article represented by path 812 of FIG. 10 can be classified as being "inside" with respect to infrastructure feature 604 even though according to the reported coordinate location data the article represented by path 812 is currently "outside" with respect to infrastructure 804 as shown by FIG. 10. Based on the determination that the mobile article of path 812 is actually inside with respect to infrastructure feature 604, manager system 110 can at block 522 (FIG. 5) output calibrated location data. The output calibrated location data can include, e.g. metadata associated to coordinate location data indicating the "region" of the article with respect to infrastructure feature, e.g. inside or outside, "first side" or "second side", "first region", "second region" or "third region". The coordinate location data for calibration thereof can be adjusted as well, e.g. subject to an offset correction based on the determination that the article is actually inside with respect to an infrastructure feature and not outside with respect to an infrastructure feature.

Manager system 110 can apply machine logic rules to determine attributes of the offset. For example, when a movement path based on reported coordinate location data is outside an infrastructure feature 604, is determined to be inside with respect to the infrastructure feature the values associated with the calibration can be based on data of past users, e.g. based on data of registered movement path history area 2122 of data repository 112. For example, where registered path data of registered movement path history area 2122 indicates that certain locations of a region are invalid based on their not being subject to travel as indicated by movement path data, manager system 110 can specify such locations as invalid calibrated location data locations and accordingly can specify calibrated location data to avoid conflict with such invalid data.

Manager system 110 can apply machine logic rules to determine attributes of the offset in another aspect by performing an intersecting and fitting an analysis using coordinate location data of the map 600 (FIG. 6) which coordinate location data can be located in map data of maps area 2121 for a current geographical error. For determining attributes of an offset manager system 110 can assess whether a candidate calibrated movement path produced by a first candidate offset intersects with coordinates of infrastructure feature 604 specified in map data and if there is an intersection can assess a next candidate offset and so on until a candidate movement path is identifies that "fits" and does not intersect infrastructure feature coordinates, whereupon manager system 110 selects the candidate movement path that does not intersect an infrastructure feature as the provided calibrated movement path. The selection of an initial candidate movement path can be based on an initial region classification (e.g. inside or outside) as set forth herein to reduce latency associated with testing of multiple candidate movement paths.

For performing a classification process at block 514 (FIG. 5) to classify a current path manager system 110 can apply machine learning algorithms. For example, as set forth herein, after a reported coordinate location is calibrated manager system 110 can record a calibrated path into registered movement path history area 2122 for use in later calibrations that are performed by system 100. In one embodiment, responsive to the providing of calibrated location data at 1105 (FIG. 3) and block 522 (FIG. 5) manager system 110 can store the calibrated location data including calibrated motion path data into data repository 112. In one embodiment, manager system 110 can store calibrated movement path data resulting from each calibration into registered movement path history area 2122. In further aspect on storing each registered movement path, manager system 110 can associate to the movement path in registered movement path history area 2122 region classification (e.g. inside or outside) as determined by the calibration as well as an infrastructure feature serial number identifier. Accordingly, for each infrastructure feature such as infrastructure feature 604 of a geographical area services by manager system 110 registered movement path history area 2122 can include a plurality of historical registered movement paths of articles 120A-120Z and a region classification associated to each registered movement path. The information registered movement paths associated to region classifications can be stored in LUT area 2125 of data repository 112 for ready use by manager system 110 in performing region classifications.

In one embodiment, a process for performing current path classification at block 514 (FIG. 5) can include subjecting a current reported uncalibrated coordinate location movement path to examining in reference to historical registered movement paths associated to the identified relevant infrastructure feature, e.g. determined to be most proximate the current reported location of the article being subject to classification.

Figure 12:
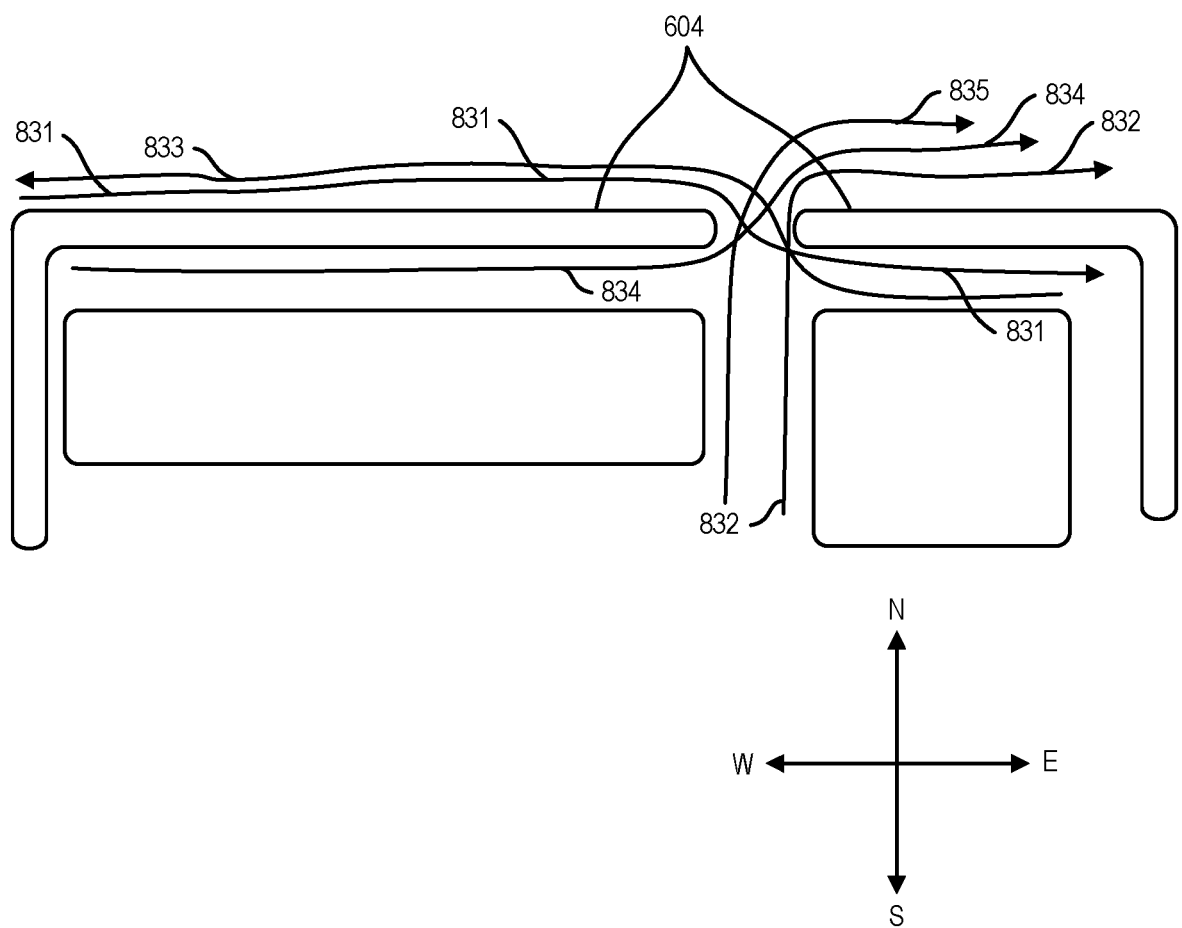
FIG. 12 depicts an infrastructure feature with natural movement path relative to the infrastructure features superimposed thereon according to one embodiment.

Referring to FIG. 12, movement paths 831-835 are calibrated coordinate location movement paths of different articles, which can be obtained from registered movement path history area 2122 based on prior calibrations by manager system 110. The path data of paths 831-835 can differ from the path data of 821-825 in that while the path data of 821-825 can represent idealized path data, the path data of movement paths 831-835 can represent natural movement path data representing actual movement of articles in a naturally occurring situational environment rather than an anticipated environment. The path data indicated in FIG. 12 can be supplemented over time as additional calibrated location data is stored by manager system 110 into a registered movement path history area 2122 of data repository 112. For performing classification at block 514 manager system 110 can examine current reported location coordinate movement data path data, e.g. of path 812 as shown in FIG. 10 in reference to paths 831-835 as shown in FIG. 12. The examining can include determining a dissimilarity score between an obtained movement path 812 for subjecting to calibration processing (FIG. 10) and each reference movement path of 831-835 (FIG. 12).

Dissimilarity scoring as set forth herein can employ e.g. cosine similarity analysis, clustering analysis, affinity propagation, recurrence plot processing, self-similarity matric processing, semantic similarity analysis, and/or string metric analysis. In a further aspect, as set forth herein each movement paths 831-835 stored in registered movement path history area 2222 and 2122 can include an associated "region" classification, e.g. outside or inside with reference to an infrastructure feature 604 in the described example. In one embodiment LUT area 2125 can include LUTs that associate reference movement paths as set forth herein (e.g. provided by logging historical paths and/or manually generated) to region classifications and manager system 110 can use such LUT to determine region classification by way of matching and table lookup. Manager system 110 can select the path 831-835 having the lowest dissimilarity score with reference to the obtained movement path 812 of FIG. 10 being examined and can select that path as the matching path. Manager system 110 can look up the region classification of the selected matching (lowest dissimilarity score) movement path and use that classification, e.g. "outside" or "inside" as the classification for the movement path being subject to classification processing at block 514. It will be seen that movement paths stored in an LUT for use in performing region classification can encompass the information of direction change sequence information as set forth in Table A. That is, reference movement paths herein that can be stored in registered movement path history area 2122 can be regarded to include direction change sequence information plus additional information including timing information which can be useful for performance of dissimilarity scoring.

Manager system 110 in one embodiment for comparing an obtained movement path to a reference path e.g. as stored in registered movement path history area 2122, or when determining data of a classification aiding LUT as shown in Table A can exclude path data outside of buffer zone e.g. buffer zone 604Z as shown in FIG. 10

For using registered movement path history area 2122 to determine a region classification of a movement path, manager system 110 need not base classification on identification of a registered movement path having the lowest dissimilarity score when compared to an obtainment movement path. For example, an obtained movement path being subject to calibration can be compared successively to N registered movement paths and for each comparison a dissimilarity score and a confidence level can be reported. Manager system 110 can maintain an aggregate confidence level in a classification that is updated based on each comparison and a registered region classification can be triggered based on the aggregate confidence level exceeding a threshold. Thus, processing can be performed with sustained low latency as movement path data accumulates.

In the described example of reported coordinate location movement path 812 of FIG. 10 and the registered movement paths 831-835 of FIG. 12 manager system 110 can select path 831 as the matching path to path 812 and again can classify path 812 as being of the region "inside" of infrastructure feature 604 and not outside of infrastructure feature 604 as is indicated by the reported coordinate location data depicted in FIG. 10. Manager system 110 can have features so that the data of registered movement path history area 2122 can be supplemented e.g. on an iterative basis through the lifetime of the deployment of system 100 so that with the iteratively updated decision driving data, accuracy of system 100 is iteratively improved. One such example has already been described; namely, manager system 110 can be configured to update registered movement path history area 2122 each time movement path data with a region classification is provided.

Figure 13:
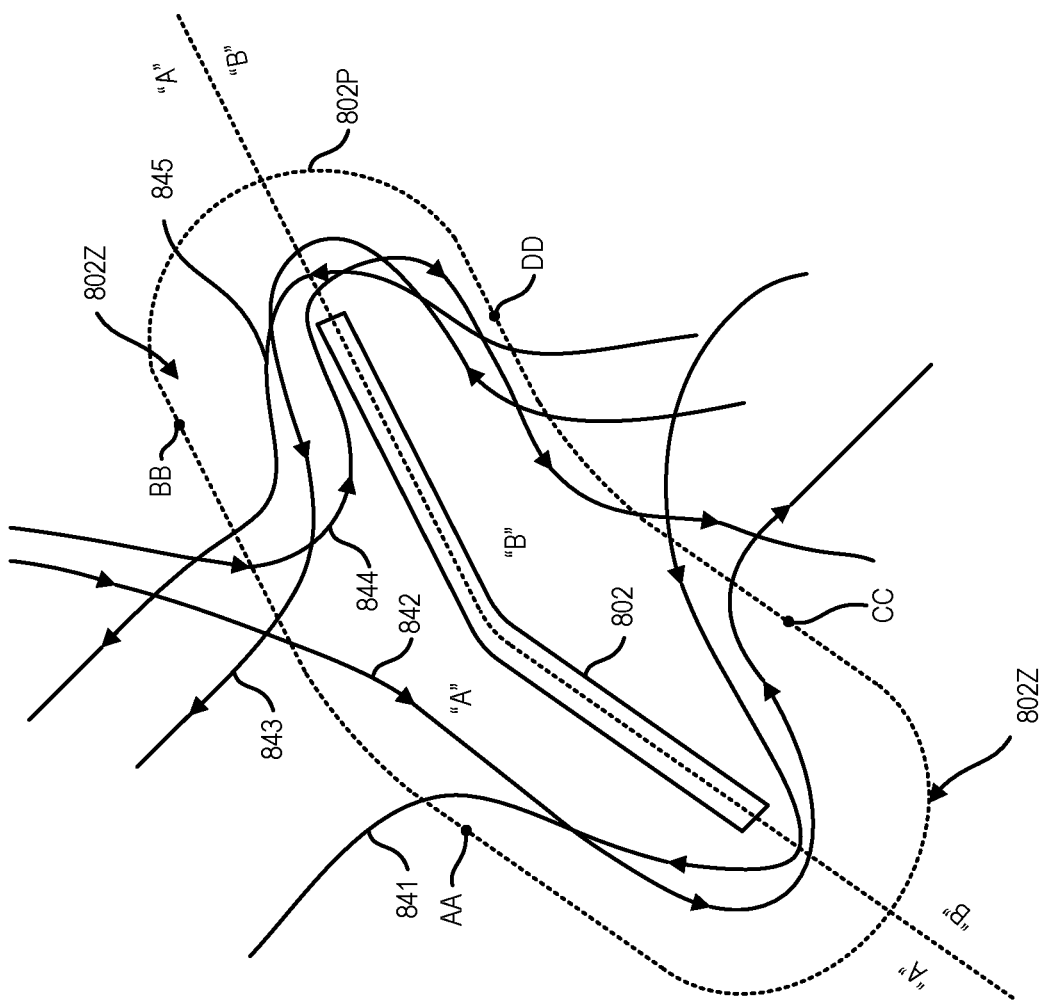
FIG. 13 depicts an infrastructure feature with movement paths relative to the infrastructure feature superimposed thereon according to one embodiment.

Another example is described with reference to FIG. 13. Referring to FIG. 13, movement paths 841-845 are uncalibrated coordinate location movement paths of different mobile articles relative to infrastructure feature 802 shown as having an arbitrary shape and a buffer zone defining a geofence having geofence perimeter 802P. The movement paths 841-845 can be obtained based on data of uncalibrated location data area 2123 and can be stored into registered movement path history area 2122 for use in performing region classification. While movement paths 841-845 may not be calibrated, manager system 110 for selection of movement paths 841-845 can activate a coarse filter so that candidate movement paths are excluded to the extent they include invalid location data e.g. a path crossing through a location of an infrastructure feature 802 defining a barrier to travel and line of sight. Movement paths 841-845 can be passthrough movement paths representing movement a movement articles through buffer zone 802Z. Manager system 110 can perform processing to determine a region classification for each movement path. For example, manager system 110 can classify movement paths indicating entry of a buffer zone 802Z between coordinates CC and DD and exiting between coordinates AA and BB as having the region classification "A" (region depicted) and can classify movement paths indicating entry of a buffer zone 802Z between coordinates AA and BB and exiting between coordinates CC and DD as having the region classification "B" (region depicted). In embodiment movement path processing can exclude data outside of an established buffer zone.

Figure 6:
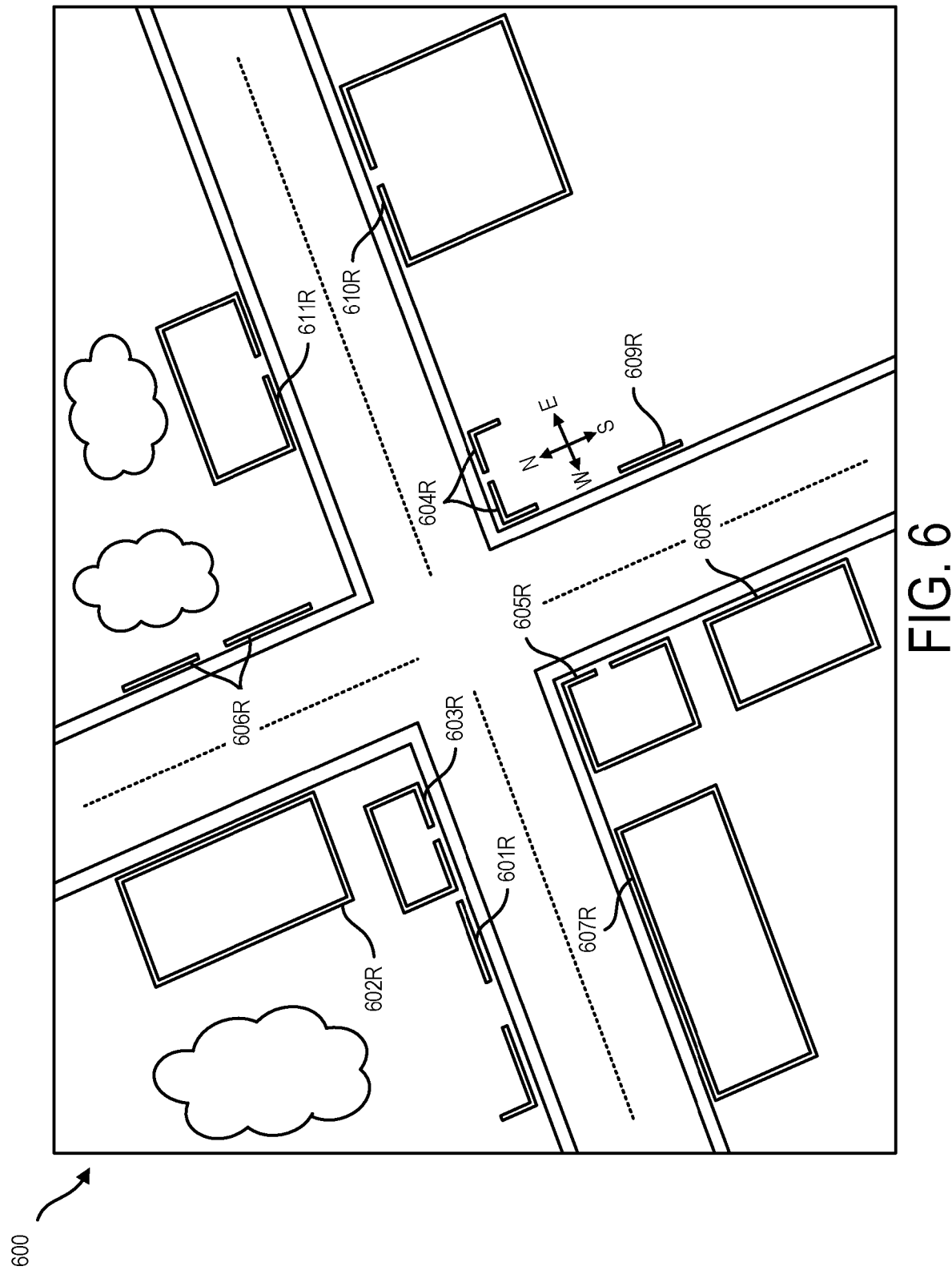
FIG. 6 depicts an overhead map of a geographical area having infrastructure features according to one embodiment.

Referring to path registration area 922 of administrator user interface 900, an administrator user can use area 922 to review registered movement paths that have been associated to any select feature of a geographical area being serviced, e.g. any feature associated to the feature representations 601R-611R depicted in FIG. 6. Using area 923, an administrator user can access a manual input feature which allows an administrator user to supplement or replace movement path data of registered movement path history area 2122 with manually input data, e.g. which can include e.g. data which is idealized expected path data which can be based on predetermined assumptions about article movement behavior, e.g. that is will follow certain spacing distance to barriers, follow least distance paths, and the like. Manually input data input using area 923 of administrator user interface 900 can also include the administrator user's input randomized data that represent that administrator user's perception of natural article movement which may differ from idealized movement. Manual inputting of movement path data into registered movement path history area 2122 can be advantageous in a variety of use cases, e.g. to facilitate rapid deployment in the case that a geographical area serviced by manager system 110 is expanded to encompass a new infrastructure feature.

In another aspect manager system 110 can run a training mode to facilitate entry of new registered movement paths into registered movement paths history area 2122. Using training area 924 an administrator user can activate a training mode which allows the administrator user to replicate the input of movement path data that is collected by the collection of manager system 110 of calibrated movement path data from respective articles 120A-120Z.

In training area 924 there can be displayed area 925 that displays an index number of the infrastructure feature for which related movement path data is being provided for purposes of training manager system 110 to perform path classification. Indicators 926 and 927 are start and stop indictors that allow an administrator user to specify a start location and a stop location of a training movement path and such selections can also be automated. In the use case depicted, administrator user interface 900 can be displayed on administrator client computer device 135, e.g. which can be provided by a mobile client computer device of the administrator user, e.g. a smartphone of the administrator user. The client computer device of the administrator user can have enhanced locating capability, e.g. high powered, high sensitivity radio transceivers and/or assisted GPS capability that utilizes resources of a plurality of locating technologies to derive near survey quality location accuracy. In area 928 an administrator user can specify a region classification of a training movement path completed.

With the training mode depicted by area 924 activated, administrator client computer device 135 can be fixedly attached to a moving article of articles 120A-120Z and the high accuracy path data of the administrator client computer device 135 can be collected while the mobile article is moved in a manner to simulate live movement of the article in an expected live deployment scenario.

High accuracy path data can be collected for numerous infrastructure features of a geographical area being serviced and with each simulated path administrator client computer device 135 can be physically carried to the location of each of several infrastructure features (e.g. represented by 601R-611R of FIG. 6) of a geographical area being serviced and the same process can be conducted. In area 928 an administrator can enter a region designation (e.g. inside or outside, region "A" etc.) for each training movement path conducted. All of the data provided using the training mode feature depicted in reference to area 926 can be uploaded to manager system 110 for storage into registered movement path history area 2122 to supplement or replace the deployment mode collected calibrated location registered movement path history data stored in registered movement path history area 2122.

As set forth herein, article 120A in one embodiment can be battery powered and can have featurizations for reduced power consumption. In one embodiment, article 120A (herein representative of all article 120A-120Z) can be absent of a capability to run movement path process 123 or determining process 124. In one embodiment data repository 122 of article 120A can be absent of maps area 2221, registered movement path history area 2222 and/or current movement path area.

System 100 in various embodiments can include certain distributions of processing that are targeted to achieve both reduced power consumption and increased locating accuracy. Returning to the flowchart of FIG. 3, manager system 110 in some embodiments at block 1105 can request certain data from article 120A based on manager system 110 initiating performing of determining at block 1105 and based on receipt of such request for certain data at block 1203 article 120A can responsively send the requested data. In one embodiment, system 100 can be configured so that a baseline sampling rate of article 120A recording location data into current movement path area 2223 can be greater than a sampling rate of location data sent for storage into uncalibrated location data area 2123 at block 1102. In such embodiment current movement path area 2223 which can store most recent movement path data of article 120A can be of higher resolution than location data of uncalibrated location data area 2123. The arrangement described reduces resource consumption associated with sending of location data at block 1102.

In one embodiment manager system 110 can request for receipt from article 120A at block 1203 the higher resolution motion path data for an obtained path being subject to processing for calibration at block 1105. In another embodiment, article 120A in the background can be locally performing a buffer zone classification as set forth in reference to block 506 for a most recent movement path represented in current movement path area 2223 so that buffer zone belonging classification is always available on demand. At block 1105 manager system 110 can request for receipt by article 120A the buffer zone belonging classification rather than perform the buffer zone belonging classification based on machine logic of manager system 110. In another variation location data iteratively sent to manager system 110 by article 120A at block 1202 can be marked by article 120A to include metatadata that includes positive buffer zone belonging classifications that have been determined by article 120A and manager system 110 can make a determination to proceed with a requested calibration based on an examining of such metadata indicating that received location data is associated to a buffer zone of an infrastructure feature. In another variation location data iteratively sent to manager system 110 by article 120A at block 1202 can be marked by article 120A to include metatadata that includes positive buffer zone belonging classifications that have been determined by article 120A and article 120A can increase a sampling rate of sent location data (from a baseline sampling rate) sent to manager system 110 at block 1202 so that manager system 110 in uncalibrated location data area 2123 automatically stores location data of locations within buffer zones with greater resolution than location data external to buffer zones. In one embodiment, article 120A is configured to perform all processes for calibration locally (e.g. all processes of FIG. 5 and attributed to manager system 110 of FIG. 3), but system 100 activates the local calibrating functionality only at select times, e.g. in the event radio signal degradation has reduced the quality of location data of article in uncalibrated location data area 2123 to below a threshold level, or would increase resource consumption associated with upload of high resolution movement path data from current movement path area 2223 to above a threshold, or if article 120A is docked and undergoing charging and resource consumption of article 120A is therefore less of a concern.

For storing data representing a most recent movement path of article 120A into current movement path area 2223 article 120A can run a process wherein newly obtained location data values e.g. from a GPS sensor device indicating no change from a most recent location are not recorded into current movement path area 2223 or are recorded with a reduced sampling rate relative to newly obtained location data values indicating a change from a most recent location. Accordingly, time periods where an article is moving are automatically recorded with greater resolution that time periods where an article is not moving.

Certain embodiments herein may offer various technical computing advantages, involving computing advantages to address problems arising in the realm of computer networks. Embodiments herein provide for decreased power consumption and improved battery life in mobile articles so that the articles can remain functional within a network for increased periods of time and with greater reliability. Embodiments herein can provide high accuracy locating services without reliance on processing of additional radio signals and with reduced computer hardware. Embodiments herein can feature artificial intelligence (AI) machine logic, for providing location calibrations that use crowdsourced history data collected over time from a plurality of computer users. Embodiments herein provided for physical locating of computer network computing nodes, wherein mobility of such computing nodes poses risk of disconnection of such computing nodes. Embodiments herein improve interactions between computer users who may communicate via a messaging system. Embodiments herein can feature improved tracking of computer network assets and can feature machine learning processes in which accuracy and reliability of calibrations performed by a computer network over time as results data provided by the network is logged, processed, and accessed for improved artificial intelligence (AI).

Figure 14:
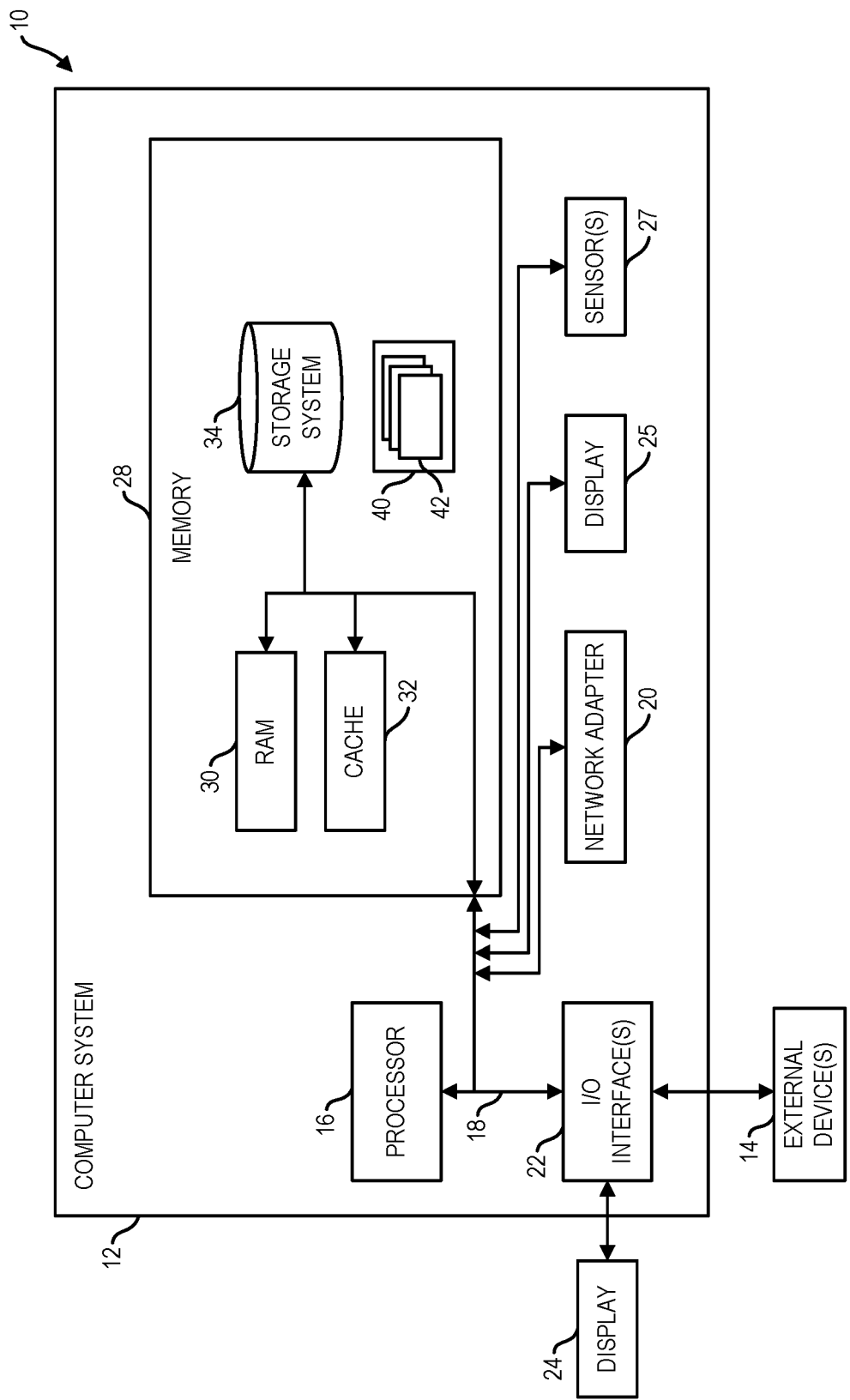
FIG. 14 depicts a computing node according to one embodiment.
Figure 15:
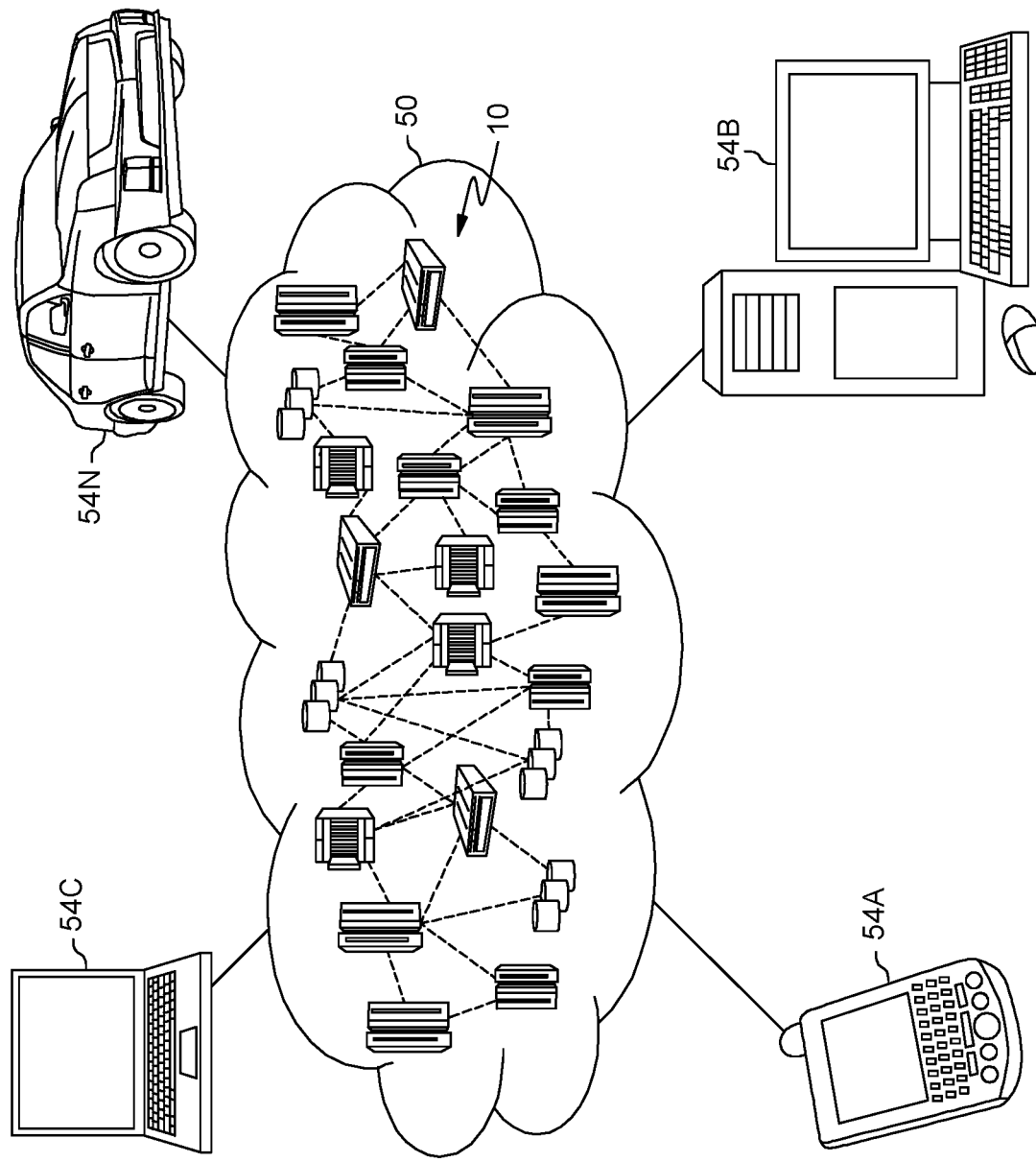
FIG. 15 depicts a cloud computing environment according to one embodiment.
Figure 16:
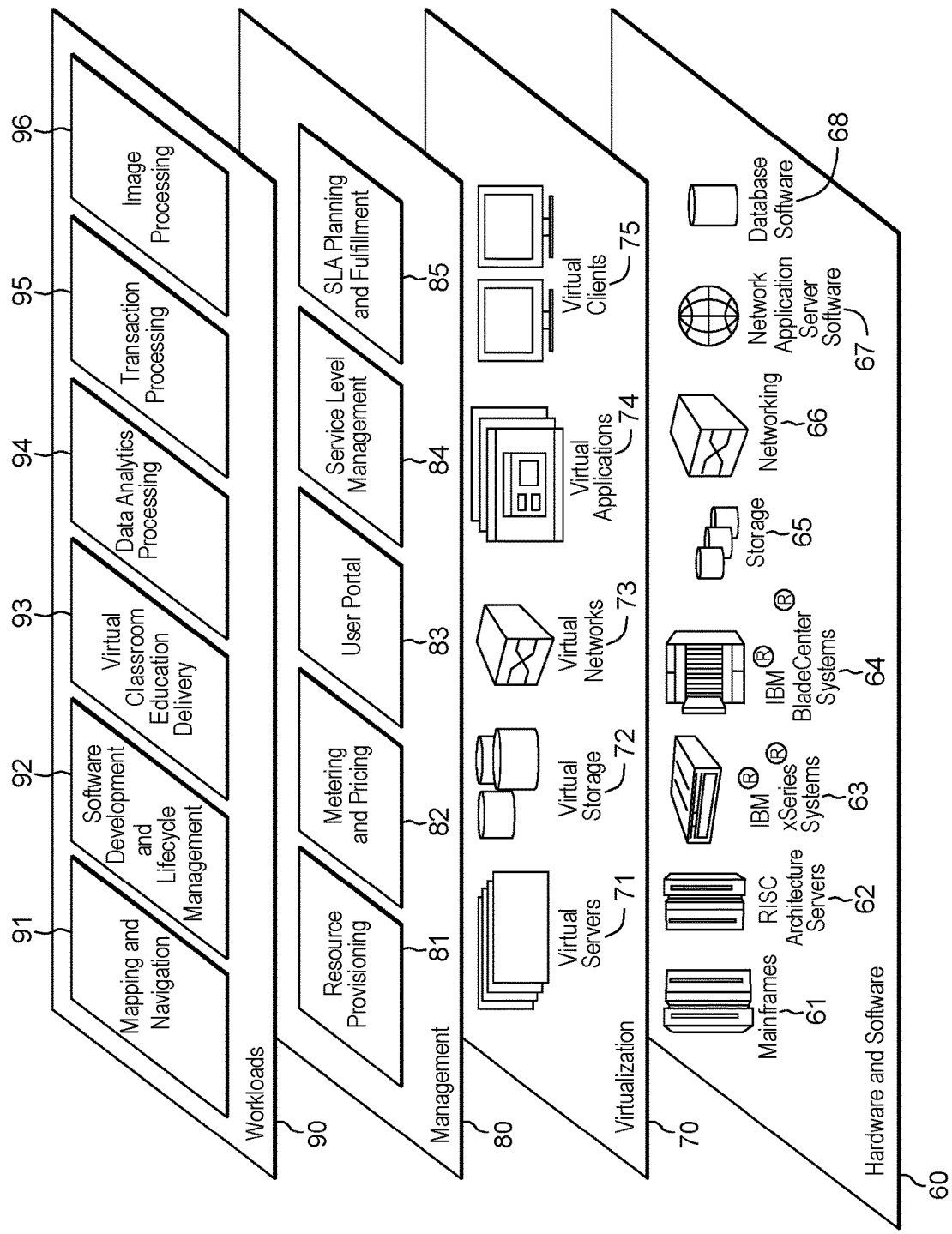
FIG. 16 depicts abstraction model layers according to one embodiment.

FIGS. 14-16 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 14, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

In FIG. 14, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 15-16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 and/or articles 120A-120Z can include one or more computing node 10 and can include one or more program 40 for performing functions described with reference to method 200 of the flowchart of FIG. 2, and the functions attributed to manager system 110 and/or article 120A described with reference the flowchart of FIG. 3, and the functions described with reference to method 500 of the flowchart of FIG. 5. In one embodiment, manager system 110 can include one or more computing node 10 and can include one or more program 40 for performing functions described with reference to manager system 110 as referenced in the flowchart of FIG. 3. In one embodiment, article 120A can include one or more computing node 10 and can include one or more program 40 for performing functions described with reference to article 120A as reference in the flowchart of FIG. 3. In one embodiment the various components set forth in reference to FIG. 1 and throughout the specification can include one or more computing node 10 and can include one or more program 40 for carrying out their respective described functions. Processes performed by one or more program 40 define machine logic.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning System (GPS) sensor device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 15 computing node 10 is described as being implemented in a cloud computing environment and accordingly is referred to as a cloud computing node in the context of FIG. 15.

Referring now to FIG. 15, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 10 and cloud computing environment 50 can communicate with any type of computerized device over any type of network and/or network addressable connection (e.g., using a web browser).

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for location calibration as set forth herein. The processing components 96 can be implemented with use of one or more program 40 described in FIG. 14.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining movement path data that specifies a location of a mobile article over time within a geographical area having an infrastructure feature;
determining based on map data and based on the movement path data calibrated location data of the mobile article, wherein the determining based on map data and based on the movement path data calibrated location data of the mobile article includes using map data that specifies coordinate location data of the infrastructure feature, wherein the method includes collecting crowd-sourced movement path data of a plurality of articles other than the mobile article representing movement of the plurality of articles through a location proximate the infrastructure feature to provide collected historical movement path data defining a plurality of collected historical movement paths, wherein the determining based on map data and based on the movement path data the calibrated location data of the mobile article includes providing a dissimilarity score between the movement path data that specifies a location of a mobile article over time within a geographical area having an infrastructure feature and reference movement path data defined by the plurality of collected historical movement paths; and
providing one or more output based on the determining, wherein the one or more output includes an output to send a notification to a user interface.

2. The method of claim 1, wherein the infrastructure feature defines a first region and a second region, wherein the calibrated location data specifies that the mobile article is in the first region or the second region with respect to the infrastructure feature, and wherein the providing one or more output includes sending a notification to a client computer device that specifies that the mobile article is in the first region or the second region with respect to the infrastructure feature.

3. The method of claim 1, wherein the determining based on map data and based on the movement path data includes providing a dissimilarity score between the movement path data that specifies a location of a mobile article over time within a geographical area having an infrastructure feature and reference movement path data defining one or more reference movement path.

4. The method of claim 1, wherein the determining based on map data and based on the movement path data includes determining that coordinate locations of the movement path data intersect coordinate locations of the infrastructure feature.

5. The method of claim 1, wherein the determining based on map data and based on the movement path data includes determining that coordinate locations of the movement path data is within an established buffer zone about the infrastructure feature.

6. The method of claim 1, wherein the map data includes an established buffer zone defined by coordinate locations established about the coordinate location data of the infrastructure feature, wherein the determining based on map data and based on the movement path data includes determining that coordinate locations of the movement path data is within the established buffer zone about the infrastructure feature.

7. The method of claim 1, wherein the determining based on map data and based on the movement path data includes providing a direction change sequence for the movement path data, examining the direction change sequence in reference to a lookup table that associates direction change sequences to region classifications, matching the provided direction change sequence to a direction change sequence specified in the lookup table and determining a region classification of the mobile article based on the matching using table lookup, wherein the region classification specifies a region that the mobile article is located in with respect to the infrastructure feature.

8. The method of claim 1, wherein the determining based on map data and based on the movement path data includes providing a dissimilarity score between the movement path data that specifies a location of a mobile article over time within a geographical area having an infrastructure feature and reference movement path data defining a plurality of reference movement paths, the plurality of reference movement paths specifying historical path paths by articles other than the mobile article within the geographical area.

9. The method of claim 1, wherein the infrastructure feature is a building that defines a first outside region and a second inside region, wherein the calibrated location data specifies that the mobile article is in the first outside region or the second inside region with respect to the infrastructure feature provided by a building, and wherein the providing one or more output includes sending a notification to a client computer device that specifies that the mobile article is in the first outside region or the second inside region with respect to the infrastructure feature provided by a building, wherein the mobile article is absent a display and includes a low power wide area network (LPWAN) transceiver, wherein the coordinate location data of the infrastructure feature includes trusted accuracy coordinate location data, and wherein the infrastructure feature defines a physical barrier to movement by the mobile article and wherein the infrastructure feature defines a line of sight barrier to inhibit viewing of the mobile article from a perspective of the first outside region to the second inside region.

10. The method of claim 1, wherein the determining based on map data and based on the movement path data includes providing a dissimilarity score between the movement path data that specifies a location of a mobile article over time within a geographical area having an infrastructure feature and reference movement path data defining a plurality of reference movement paths, the plurality of reference movement paths defined based on manually entered administrator user defined data.

11. The method of claim 1, wherein the determining based on map data and based on the movement path data includes examining a candidate calibrated movement path produced by a first candidate offset to determine whether the candidate calibrated movement path intersects with coordinates of the infrastructure feature specified in the map data and based on an intersection being observed examines a second candidate calibrated movement path produced by a second candidate offset to determine whether the second candidate calibrated movement path intersects with coordinates of the infrastructure feature specified in the map data.

12. The method of claim 1, wherein the mobile article is absent a display and includes a low power wide area network (LPWAN) transceiver, and wherein the mobile article is a personal transportation article for providing single person transportation.

13. The method of claim 1, wherein the plurality of collected historical movement paths defining the reference movement data specifies historical path paths by articles other than the mobile article within the geographical area, wherein the determining based on map data and based on the movement path data calibrated location data of the mobile article includes (a) identifying a certain historical path of the historical path paths by articles other than the mobile article as a similar path to a path of the mobile article and (b) using region classification data associated to the certain historical path.

14. The method of claim 1, wherein the determining based on map data and based on the movement path data includes examining a candidate calibrated movement path to determine whether the candidate calibrated movement path intersects with coordinates of the infrastructure feature specified in the map data and examining a second candidate calibrated movement path to determine whether the second candidate calibrated movement path intersects with coordinates of the infrastructure feature specified in the map data.

15. The method of claim 1, wherein the determining based on map data and based on the movement path data includes examining a candidate calibrated movement path produced by a first candidate offset to determine whether the candidate calibrated movement path intersects with coordinates of the infrastructure feature specified in the map data and examining a second candidate calibrated movement path produced by a second candidate offset to determine whether the second candidate calibrated movement path intersects with coordinates of the infrastructure feature specified in the map data.

16. The method of claim 1, wherein the determining based on map data and based on the movement path data includes examining a plurality of candidate calibrated movement paths to determine whether the plurality of candidate calibrated movement paths intersect with coordinates of the infrastructure feature specified in the map data and selecting one path of the plurality of candidate calibrated movement paths as the calibrated movement path based on the one path fitting with and not intersecting the coordinates of the infrastructure feature specified in the map data.

17. The method of claim 1, wherein the determining based on map data and based on the movement path data includes determining for the mobile article a first region classification, wherein the first region classification specifies a first region in respect to the infrastructure feature, wherein the method includes obtaining second movement path data that specifies a location of a second mobile article over time within the geographical area having the infrastructure feature, wherein the method includes identifying a second direction change sequence for the second movement path data, and determining for the second mobile article a second region classification based on the second direction change sequence for the second movement path data, wherein the second region classification specifies a second region in respect to the infrastructure feature.

18. The method of claim 1, wherein the determining based on map data and based on the movement path data includes determining for the mobile article a first region classification, wherein the first region classification specifies a first region in respect to the infrastructure feature, wherein the method includes obtaining second movement path data that specifies a location of a second mobile article over time within the geographical area having the infrastructure feature, wherein the method includes determining for the second mobile article a second region classification wherein the second region classification specifies a second region in respect to the infrastructure feature.

19. The method of claim 1, wherein the map data includes an established buffer zone defined by coordinate locations established about the coordinate location data of the infrastructure feature, wherein the determining based on map data and based on the movement path data includes determining that coordinate locations of the movement path data is within the established buffer zone about the infrastructure feature, wherein the method includes the mobile article sending location data determined by the mobile article to be of the buffer zone to an external manager system external and remote from the mobile article at a sampling rate that is increased from a baseline sampling rate, wherein the method includes collecting by the manager system crowdsourced movement path data of a plurality of articles other than the mobile article representing movement of the plurality of articles through a location proximate the infrastructure feature to provided collected historical movement path data defining a plurality of collected historical movement paths, wherein the determining based on map data and based on the movement path data includes providing a dissimilarity score between the movement path data that specifies a location of a mobile article over time within a geographical area having an infrastructure feature and reference movement path data defined by the plurality of collected historical movement paths.

20. The method of claim 1, wherein the determining based on map data and based on the movement path data includes examining a candidate calibrated movement path to determine whether the candidate calibrated movement path intersects with coordinates of the infrastructure feature specified in the map data and examining, based on an intersection being observed, a second candidate calibrated movement path to determine whether the second candidate calibrated movement path intersects with coordinates of the infrastructure feature specified in the map data.

21. The method of claim 1, wherein the map data includes an established infrastructure feature buffer zone defined by buffer zone coordinate locations larger than and encompassing coordinate locations of the infrastructure feature defined by the coordinate location data of the infrastructure feature, wherein the determining based on map data and based on the movement path data the calibrated location data of the mobile article includes (i) ascertaining that coordinate locations of the movement path data are within the established buffer zone having coordinate locations larger than and encompassing coordinate locations of the infrastructure feature, and (ii) responsively to the ascertaining, adjusting coordinates of the movement path data that specifies a location of a mobile article over time to provide the calibrated location data of the mobile article.

22. A system comprising:
a memory;
at least one processor in communication with the memory; and
program instructions executable by one or more processor via the memory to perform a method comprising:
  obtaining movement path data that specifies a location of a mobile article over time within a geographical area having an infrastructure feature;
  determining based on map data and based on the movement path data calibrated location data of the mobile article, wherein the determining based on map data and based on the movement path data calibrated location data of the mobile article includes using map data that specifies coordinate location data of the infrastructure feature, wherein the method includes collecting crowdsourced movement path data of a plurality of articles other than the mobile article representing movement of the plurality of articles through a location proximate the infrastructure feature to provide collected historical movement path data defining a plurality of collected historical movement paths, wherein the determining based on map data and based on the movement path data the calibrated location data of the mobile article includes providing a dissimilarity score between the movement path data that specifies a location of a mobile article over time within a geographical area having an infrastructure feature and reference movement path data defined by the plurality of collected historical movement paths; and
  providing one or more output based on the determining, wherein the one or more output includes an output to send a notification to a user interface.

23. A computer program product comprising:
a computer readable storage medium readable by one or more processing circuit and storing instructions for execution by one or more processor for performing a method comprising:
  obtaining movement path data that specifies a location of a mobile article over time within a geographical area having an infrastructure feature;
  determining based on map data and based on the movement path data calibrated location data of the mobile article, wherein the determining based on map data and based on the movement path data calibrated location data of the mobile article includes using map data that specifies coordinate location data of the infrastructure feature, wherein the method includes collecting crowdsourced movement path data of a plurality of articles other than the mobile article representing movement of the plurality of articles through a location proximate the infrastructure feature to provide collected historical movement path data defining a plurality of collected historical movement paths, wherein the determining based on map data and based on the movement path data the calibrated location data of the mobile article includes providing a dissimilarity score between the movement path data that specifies a location of a mobile article over time within a geographical area having an infrastructure feature and reference movement path data defined by the plurality of collected historical movement paths; and
  providing one or more output based on the determining, wherein the one or more output includes an output to send a notification to a user interface.

24. A method comprising:
obtaining movement path data that specifies a location of a mobile article over time within a geographical area having an infrastructure feature;
determining based on map data and based on the movement path data calibrated location data of the mobile article, wherein the determining based on map data and based on the movement path data calibrated location data of the mobile article includes using map data that specifies coordinate location data of the infrastructure feature, wherein the method includes collecting crowdsourced movement path data of a plurality of articles other than the mobile article representing movement of the plurality of articles through a location proximate the infrastructure feature to provided collected historical movement path data defining a plurality of collected historical movement paths, wherein the determining based on map data and based on the movement path data includes providing a dissimilarity score between the movement path data that specifies a location of a mobile article over time within a geographical area having an infrastructure feature and reference movement path data defined by the plurality of collected historical movement paths, and wherein the infrastructure feature defines a physical barrier to movement by the mobile article and wherein the infrastructure feature defines a line of sight barrier to inhibit viewing of the mobile article from a perspective of a first region defined by the infrastructure feature to a second region defined by the infrastructure feature; and
providing one or more output based on the determining.

25. A method comprising:
obtaining movement path data that specifies a location of a mobile article over time within a geographical area having an infrastructure feature;
determining based on map data and based on the movement path data calibrated location data of the mobile article, wherein the determining based on map data and based on the movement path data calibrated location data of the mobile article includes using map data that specifies coordinate location data of the infrastructure feature, wherein the map data includes an established buffer zone defined by coordinate locations established about the coordinate location data of the infrastructure feature, wherein the determining based on map data and based on the movement path data includes determining that coordinate locations of the movement path data is within the established buffer zone about the infrastructure feature, wherein the method includes the mobile article sending location data determined by the mobile article to be of the buffer zone to an external manager system external and remote from the mobile article at a sampling rate that is increased from a baseline sampling rate, wherein the method includes collecting by the manager system crowdsourced movement path data of a plurality of articles other than the mobile article representing movement of the plurality of articles through a location proximate the infrastructure feature to provided collected historical movement path data defining a plurality of collected historical movement paths, wherein the determining based on map data and based on the movement path data includes providing a dissimilarity score between the movement path data that specifies a location of a mobile article over time within a geographical area having an infrastructure feature and reference movement path data defined by the plurality of collected historical movement paths; and providing one or more output based on the determining.

* * * * *